(12) United States Patent
Chen et al.

(10) Patent No.: US 10,365,459 B2
(45) Date of Patent: Jul. 30, 2019

(54) IMAGING OPTICAL LENS ASSEMBLY, IMAGE CAPTURING UNIT AND ELECTRONIC DEVICE

(71) Applicant: LARGAN PRECISION CO.,LTD., Taichung (TW)

(72) Inventors: Chun-Yen Chen, Taichung (TW); Shu-Yun Yang, Taichung (TW)

(73) Assignee: LARGAN PRECISION CO., LTD., Tiachung (TW)

( * ) Notice: Subject to any disclaimer, the term of this patent is extended or adjusted under 35 U.S.C. 154(b) by 0 days.

(21) Appl. No.: 15/720,780

(22) Filed: Sep. 29, 2017

(65) Prior Publication Data

US 2018/0024328 A1 Jan. 25, 2018

Related U.S. Application Data

(63) Continuation of application No. 15/186,362, filed on Jun. 17, 2016, now Pat. No. 9,823,445.

(30) Foreign Application Priority Data

Apr. 20, 2016 (TW) .............................. 105112345 A

(51) Int. Cl.
*G02B 9/62* (2006.01)
*G02B 13/00* (2006.01)
*G02B 1/04* (2006.01)
*G02B 9/60* (2006.01)
*G02B 13/06* (2006.01)

(52) U.S. Cl.
CPC ......... *G02B 13/0045* (2013.01); *G02B 1/041* (2013.01); *G02B 9/60* (2013.01); *G02B 9/62* (2013.01); *G02B 13/006* (2013.01); *G02B 13/06* (2013.01)

(58) Field of Classification Search
CPC ....... G02B 9/62; G02B 13/04; G02B 13/0045
USPC ................................ 359/713, 752, 761, 762
See application file for complete search history.

(56) References Cited

U.S. PATENT DOCUMENTS

| | | | |
|---|---|---|---|
| 4,854,680 A | 8/1989 | Kikuchi | |
| 5,418,647 A | 5/1995 | Ishisaka | |
| 5,684,638 A | 11/1997 | Kamo et al. | |
| 5,808,812 A | 9/1998 | Kamo | |
| 5,822,129 A | 10/1998 | Sekine | |
| 2012/0105981 A1 | 5/2012 | Peng et al. | |
| 2014/0118845 A1 | 5/2014 | Komiyama | |
| 2015/0205070 A1* | 7/2015 | Lee .................... | G02B 13/0045 359/713 |
| 2016/0077312 A1 | 3/2016 | Kwon | |

(Continued)

FOREIGN PATENT DOCUMENTS

| | | |
|---|---|---|
| CN | 202083826 U | 12/2011 |
| JP | 1990272513 A | 11/1990 |

(Continued)

*Primary Examiner* — William Choi
(74) *Attorney, Agent, or Firm* — Maschoff Brennan

(57) ABSTRACT

An imaging optical lens assembly includes, in order from an object side to an image side, a first lens element, a second lens element, a third lens element, a fourth lens element, a fifth lens element and a sixth lens element. The first lens element has negative refractive power. The second lens element has negative refractive power. The third lens element has negative refractive power. The imaging optical lens assembly has a total of six lens elements.

28 Claims, 24 Drawing Sheets

(56) References Cited

U.S. PATENT DOCUMENTS

| | | |
|---|---|---|
| 2017/0059820 A1 | 3/2017 | Tang et al. |
| 2017/0068070 A1 | 3/2017 | Tang et al. |
| 2017/0097498 A1 | 4/2017 | Amanai |
| 2017/0153416 A1 | 6/2017 | Hsieh et al. |
| 2017/0153419 A1 | 6/2017 | Hsieh et al. |

FOREIGN PATENT DOCUMENTS

| | | |
|---|---|---|
| JP | 1994347696 A | 12/1994 |
| JP | 1996327918 A | 12/1996 |
| JP | 1997304694 A | 11/1997 |
| JP | 2007071979 A | 3/2007 |
| JP | 2007139985 A | 6/2007 |
| JP | 2009265338 A | 11/2009 |
| JP | 2009300797 A | 12/2009 |
| JP | 2010009028 A | 1/2010 |
| JP | 2012098724 A | 5/2012 |
| JP | 2013109052 A | 6/2013 |
| JP | 2014010399 A | 1/2014 |
| JP | 2014010400 A | 1/2014 |
| JP | 2014010401 A | 1/2014 |
| JP | 2014085559 A | 5/2014 |
| JP | 2015034922 A | 2/2015 |

\* cited by examiner

IMAGING OPTICAL LENS ASSEMBLY, IMAGE CAPTURING UNIT AND ELECTRONIC DEVICE

RELATED APPLICATIONS

This application is a continuation patent application of U.S. application Ser. No. 15/186,362, filed Jun. 17, 2016, which claims priority to Taiwan Application 105112345, filed Apr. 20, 2016, which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

The optical systems have been widely applied to different kinds of electronic devices, such as smart phones, wearable devices, tablet personal computers, dashboard cameras, surveillance devices, sport cameras and aerial photographic cameras, for various requirements. However, the conventional compact optical system is unable to satisfy the requirements of wide field of view, compact size, low sensitivity to environment and high image resolution simultaneously. Thus, there is a need to develop an optical system featuring a wide viewing angle, compact size, minimized environmental effects and high image quality.

SUMMARY

According to one aspect of the present disclosure, an imaging optical lens assembly includes, in order from an object side to an image side, a first lens element, a second lens element, a third lens element, a fourth lens element, a fifth lens element and a sixth lens element. The first lens element has negative refractive power. The second lens element has negative refractive power. The third lens element has negative refractive power. The imaging optical lens assembly has a total of six lens elements. When, a central thickness of the fifth lens element is CT5, a central thickness of the sixth lens element is CT6, a focal length of the imaging optical lens assembly is f, a curvature radius of an object-side surface of the third lens element is R5, a curvature radius of an image-side surface of the third lens element is R6, an axial distance between the first lens element and the second lens element is T12, the following conditions are satisfied:

$-4.50<(R5+R6)/(R5-R6)<2.80;$ $0<CT6/CT5<3.60;$ and $0.80<T12/f<2.0.$

According to another aspect of the present disclosure, an imaging optical lens assembly includes, in order from an object side to an image side, a first lens element, a second lens element, a third lens element, a fourth lens element, a fifth lens element and a sixth lens element. The first lens element has negative refractive power. The second lens element has negative refractive power. The third lens element with negative refractive power has an object-side surface being concave in a paraxial region thereof. The sixth lens element has an image-side surface being convex in a paraxial region thereof. The imaging optical lens assembly has a total of six lens elements, and a curvature radius of an image-side surface of the fifth lens element has the same sign as a curvature radius of an object-side surface of the sixth lens element. When a thickness of the fifth lens element is CT5, a thickness of the sixth lens element is CT6, a maximum image height of the imaging optical lens assembly is ImgH, a curvature radius of the object-side surface of the third lens element is R5, a curvature radius of an image-side surface of the third lens element is R6, an axial distance between an object-side surface of the first lens element and the image-side surface of the sixth lens element is Td, the following conditions are satisfied:

$-3.50<(R5+R6)/(R5-R6)<0;$ $0<CT6/CT5<3.60;$ and $1.0<Td/ImgH<12.5.$

According to another aspect of the present disclosure, an image capturing unit includes the aforementioned imaging optical lens assembly and an image sensor, wherein the image sensor is disposed on an image surface of the imaging optical lens assembly.

According to still another aspect of the present disclosure, an electronic device includes the aforementioned image capturing unit.

According to still yet another aspect of the present disclosure, an imaging optical lens assembly includes, in order from an object side to an image side, a first lens element, a second lens element, a third lens element, a fourth lens element, a fifth lens element and a sixth lens element. The first lens element has negative refractive power. The second lens element has negative refractive power. The third lens element with negative refractive power has an object-side surface being concave in a paraxial region thereof. The fourth lens element has positive refractive power. The sixth lens element has an image-side surface being convex in a paraxial region thereof. The imaging optical lens assembly has a total of six lens elements. When a central thickness of the fifth lens element is CT5, a central thickness of the sixth lens element is CT6, a focal length of the imaging optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, a sum of absolute values of ratios f/fi is Σ|f/fi|, a curvature radius of the object-side surface of the third lens element is R5, a curvature radius of an image-side surface of the third lens element is R6, the following conditions are satisfied:

$-4.0<(R5+R6)/(R5-R6)<0.65;$ $0<CT6/CT5<3.60;$ and $2.0<\Sigma|f/fi|<5.0,$ wherein $i=1,2,3,4,5,6.$ According to still yet another aspect of the present disclosure, an image capturing unit includes the aforementioned imaging optical lens assembly and an image sensor, wherein the image sensor is disposed on an image surface of the imaging optical lens assembly.

According to still yet another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
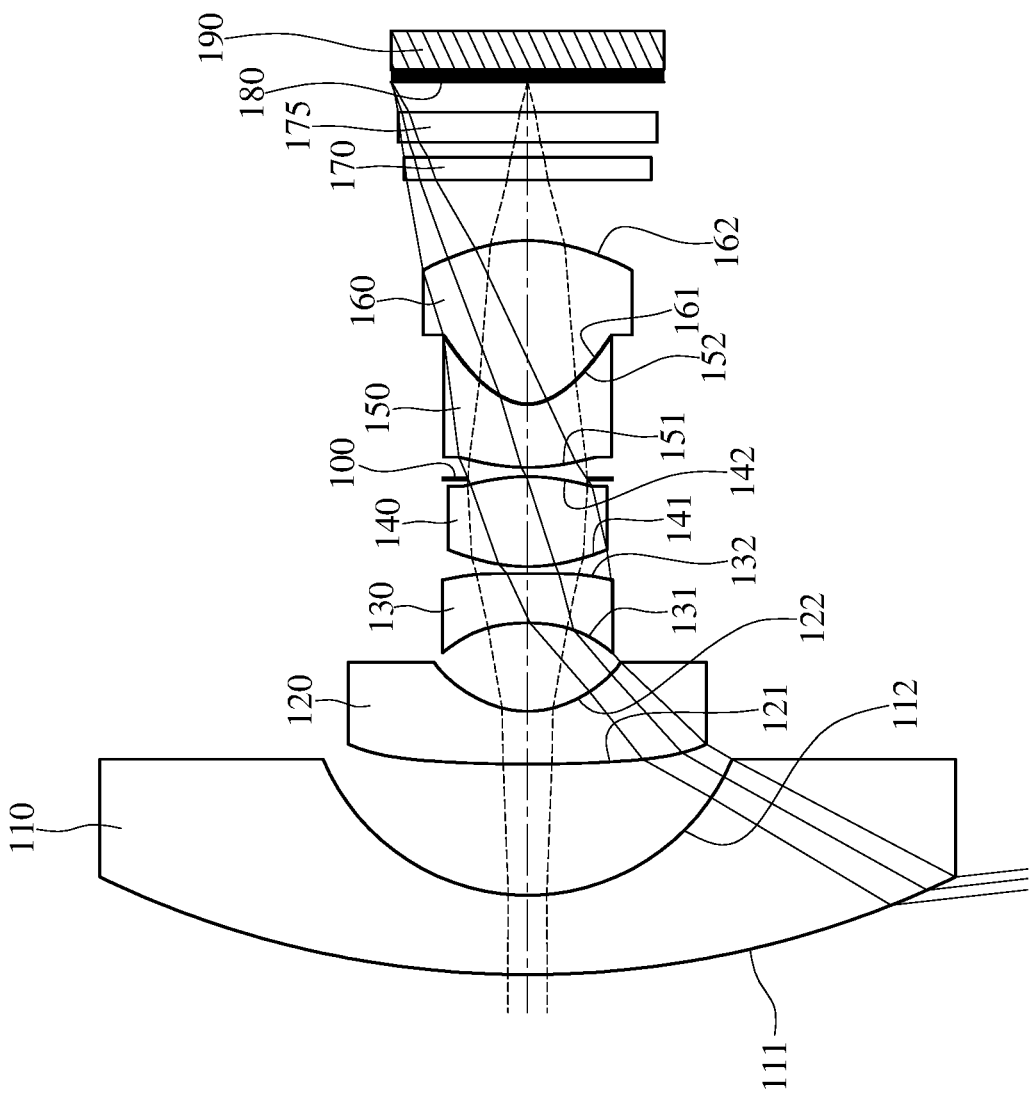
FIG. 1 is a schematic view of an image capturing unit according to the 1st embodiment of the present disclosure.

An imaging optical lens assembly includes, in order from an object side to an image side, a first lens element, a second lens element, a third lens element, a fourth lens element, a fifth lens element and a sixth lens element. The imaging optical lens assembly has a total of six lens elements.

Each of the first lens element and the second lens element has negative refractive power. Therefore, it is favorable for providing the imaging optical lens assembly with a retrofocus configuration for projecting light from a large field of view in the imaging optical lens assembly.

The third lens element has negative refractive power. Furthermore, the third lens element can have an object-side surface being concave in a paraxial region thereof. Therefore, it is favorable for balancing the negative refractive power distribution among the first and the second lens elements so as to reduce astigmatism and improve the image quality. In addition, at least one of an object-side surface of the second lens element, an image-side surface of the second lens element, the object-side surface of the third lens element and an image-side surface of the third lens element can have at least one inflection point so that it is favorable for correcting aberrations at the off-axial region generated by the large field of view.

The fourth lens element can have positive refractive power. Therefore, it is favorable for balancing with the negative refractive power distribution among the first, second and third lens elements so as to reduce a total track length of the imaging optical lens assembly.

The fifth lens element can have an object-side surface being convex in a paraxial region thereof. Therefore, it is favorable for arranging lens curvature so as to improve the image quality.

The sixth lens element can have an image-side surface being convex in a paraxial region thereof. Therefore, it is favorable for reducing a back focal length of the imaging optical lens assembly so as to correct the Petzval sum thereof, thereby improving the flatness of the image surface.

According to the imaging optical lens assembly of the present disclosure, a curvature radius of an image-side surface of the fifth lens element has the same sign as a curvature radius of an object-side surface of the sixth lens element. In detail, the curvature radius of the image-side surface of the fifth lens element and the curvature radius of the object-side surface of the sixth lens element can both be positive or negative. Therefore, it is favorable for arranging the surface shapes of the fifth and the sixth lens elements adjacent to each other, thereby reducing the sensitivity of the imaging optical lens assembly.

According to the imaging optical lens assembly of the present disclosure, one of the fifth lens element and the sixth lens element can have positive refractive power, and the other one of the fifth lens element and the sixth lens element can have negative refractive power. In detail, the refractive power of the fifth lens element and that of the sixth lens element can have different signs. Therefore, it is favorable for balancing the refractive power distribution at the image side of the imaging optical lens assembly so as to correct chromatic aberration.

According to the imaging optical lens assembly of the present disclosure, the image-side surface of the fifth lens element and the object-side surface of the sixth lens element can be cemented together, and each of the image-side surface of the fifth lens element and the object-side surface of the sixth lens element can be aspheric. That is, the fifth lens element and the sixth lens element can be connected as a cemented lens element, and the cementing surfaces of the fifth lens element and the sixth lens element can be aspheric. Therefore, it is favorable for reducing the temperature effect and providing higher flexibility in lens shape designs, thereby reducing aberrations at the off-axial region.

When a curvature radius of the object-side surface of the third lens element is R5, a curvature radius of the image-side surface of the third lens element is R6, the following condition is satisfied: $-4.50 < (R5+R6)/(R5-R6) < 2.80$. Therefore, it is favorable for arranging the surface shapes of the third lens element without being overly curved so as to increase the manufacturing yield rate. In addition, it is favorable for correcting distortion with a large field of view. Preferably, the following condition can also be satisfied: $-4.0 < (R5+R6)/(R5-R6) < 0.65$. More preferably, the following condition can also be satisfied: $-3.50 < (R5+R6)/(R5-R6) < 0$.

When a thickness of the fifth lens element is CT5, a thickness of the sixth lens element is CT6, the following condition is satisfied: $0 < CT6/CT5 < 3.60$. Therefore, it is favorable for configuring the thickness of each lens element at the image side so as to improve the image quality. Preferably, the following condition can also be satisfied: $0 < CT6/CT5 < 3.25$.

When a focal length of the imaging optical lens assembly is f, an axial distance between the first lens element and the second lens element is T12, the following condition can be satisfied: $0.80 < T12/f < 2.0$. Therefore, it is favorable for obtaining wide angle and compactness characteristics so as to correct axial chromatic aberration while reducing the axial distance between the first lens element and the second lens element. Thus, it is favorable for lens assembling and miniaturization. Preferably, the following condition can also be satisfied: $1.55 < T12/f < 2.0$.

When a maximum image height of the imaging optical lens assembly (half of a diagonal length of an effective photosensitive area of an image sensor) is ImgH, an axial distance between an object-side surface of the first lens element and the image-side surface of the sixth lens element is Td, the following condition can be satisfied: $1.0 < Td/ImgH < 12.5$. Therefore, it is favorable for arranging the ratio of the total track length to the image height so that the imaging optical lens assembly can be utilized for more applications. Preferably, the following condition can also be satisfied: $4.0 < Td/ImgH < 8.5$.

When the focal length of the imaging optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, that is, the focal length of the i-th lens element is fi, a sum of absolute values of ratios f/fi is $\Sigma|f/fi|$, the following condition can be satisfied: $2.0 < \Sigma|f/fi| < 5.0$, wherein i=1, 2, 3, 4, 5, 6 (which means that the condition, $2.0 < |f/f1|+|f/f2|+|f/f3|+|f/f4|+|f/f5|+|f/f6| < 5.0$, can be satisfied). Therefore, it is favorable for arranging the sum of the refractive power of the lens elements so as to balance the refractive power of each lens element while maintaining the wide angle characteristic.

When a curvature radius of an object-side surface of the fourth lens element is R7, and a curvature radius of an image-side surface of the fourth lens element is R8, the following condition can be satisfied: $|R7/R8| < 1.10$. Therefore, it is favorable for arranging the surface shapes of the fourth lens element so as to correct aberrations generated by the first through the third lens elements.

When a curvature radius of the object-side surface of the sixth lens element is R11, a curvature radius of the image-side surface of the sixth lens element is R12, the following condition can be satisfied: $-1.80 < (R11-R12)/(R11+R12) < 2.0$. Therefore, it is favorable for arranging the surface shapes of the sixth lens element so as to correct aberrations.

When a curvature radius of the object-side surface of the fifth lens element is R9, the curvature radius of the image-side surface of the sixth lens element is R12, the following condition can be satisfied: $-1.0 < (R9+R12)/(R9-R12) < 1.0$. Therefore, it is favorable for arranging curvatures of the lens elements at the image side so as to reduce the back focal length of the imaging optical lens assembly. Preferably, the following condition can also be satisfied: $-0.20 < (R9+R12)/(R9-R12) < 0.20$.

When half of a maximal field of view of the imaging optical lens assembly is HFOV, the following condition can be satisfied: $|1/\tan(HFOV)| < 0.50$. Therefore, it is favorable for enlarging the field of view so that the imaging optical lens assembly can be utilized for more applications.

When the focal length of the first lens element is f1, the focal length of the third lens element is f3, the following condition can be satisfied: $1.25 < f1/f3 < 5.0$. Therefore, it is favorable for distributing the refractive power between the first lens element and the third lens element so as to reduce the sensitivity of the imaging optical lens assembly at the object side and correct the aberrations with the large field of view.

When the focal length of the imaging optical lens assembly is f, an axial distance between the object-side surface of the first lens element and an image surface is TL, the following condition can be satisfied: $5.0 < TL/f < 12.0$. Therefore, it is favorable for providing sufficient view angle for wider field of view and reducing the total track length of the imaging optical lens assembly.

When an entrance pupil diameter of the imaging optical lens assembly is EPD, the curvature radius of the object-side surface of the sixth lens element is R11, the following condition can be satisfied: $|R11/EPD| < 1.50$. Therefore, it is favorable for arranging the curvature of the object-side surface of the sixth lens element so as to obtain wide angle and large aperture characteristics.

Figure 21:
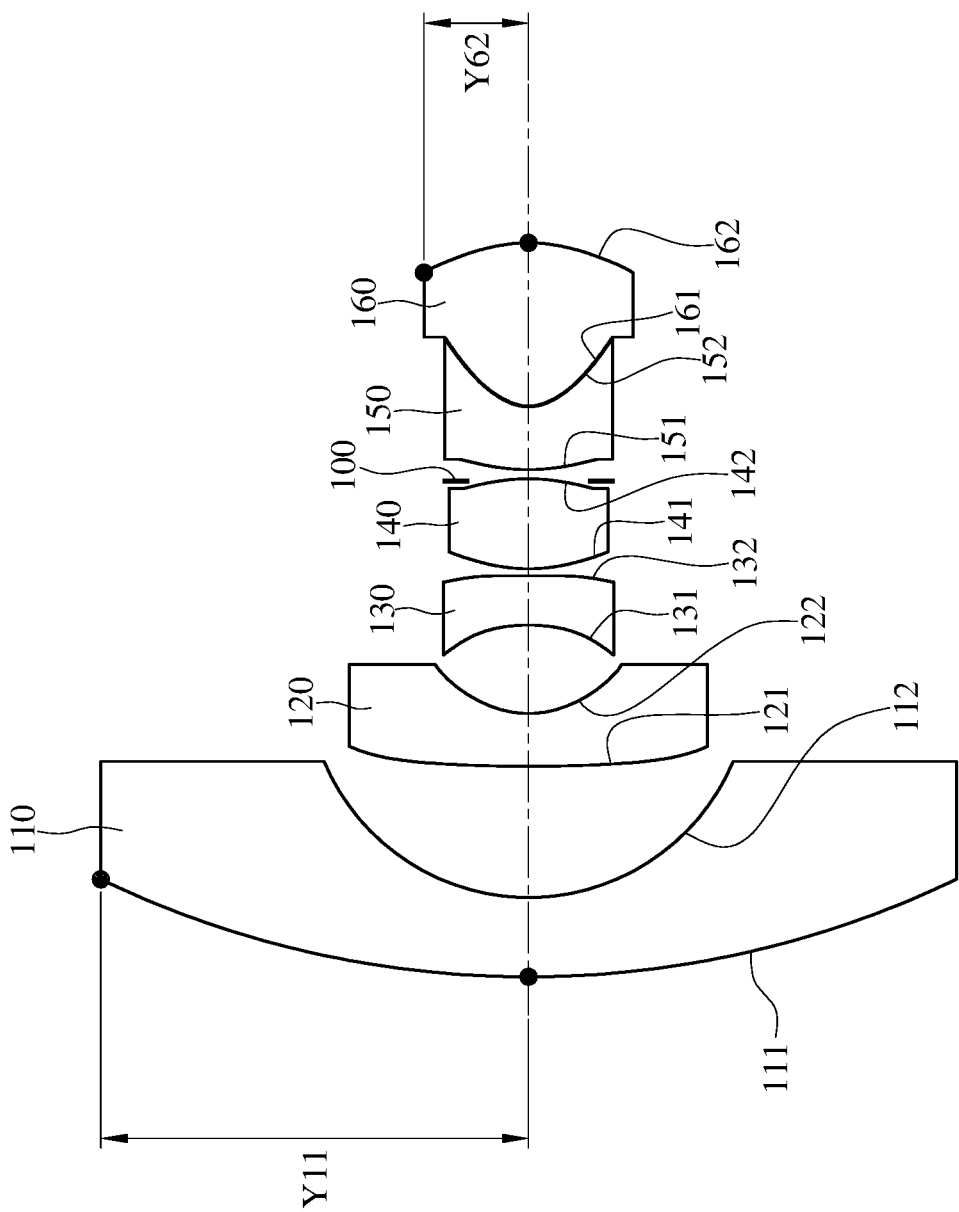
FIG. 21 shows a schematic view of the parameters Y11 and Y62 according to the 1st embodiment of the present disclosure.

When a maximum effective radius of the object-side surface of the first lens element is Y11, a maximum effective radius of the image-side surface of the sixth lens element is Y62, the following condition can be satisfied: $|Y62/Y11| < 0.48$. Therefore, it is favorable for providing a retrofocus configuration for the light at large field of view to transmit into the imaging optical lens assembly. As seen in FIG. 21, FIG. 21 shows a schematic view of the parameters Y11 and Y62 according to the 1st embodiment of the present disclosure.

When a central thickness of the second lens element is CT2, an axial distance between the second lens element and the third lens element is T23, the following condition can be satisfied: $0 < T23/CT2 \leq 1.78$. Therefore, it is favorable for arranging the central thickness of the second lens element and the axial distance between the second lens element and the third lens element, thereby improving the lens assembling process and the manufacturing yield rate.

According to the present disclosure, the lens elements of the imaging optical lens assembly can be made of glass or plastic material. In detail, in the present disclosure, at least half of the lens elements of the imaging optical lens assembly can be made of plastic material. That is, at least three of the first lens element, the second lens element, the third lens element, the fourth lens element, the fifth lens element and the sixth lens element can be made of plastic material. When the lens elements are made of glass material, the refractive power distribution of the imaging optical lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the imaging optical lens assembly can also be reduced.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the imaging optical lens assembly on a corresponding image sensor can be flat or curved, particularly a concave curved surface facing towards the object side of the imaging optical lens assembly.

According to the present disclosure, the imaging optical lens assembly can include at least one stop, such as an aperture stop, a glare stop or a field stop. Said glare stop or said field stop is allocated for eliminating the stray light and thereby improving the image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, an image capturing unit includes the aforementioned imaging optical lens assembly and image sensor, wherein the image sensor is disposed on the image side and can be located on or near the image surface of the aforementioned imaging optical lens assembly. In some embodiments, the image capturing unit can further include a barrel member, a holding member or a combination thereof.

Figure 22:
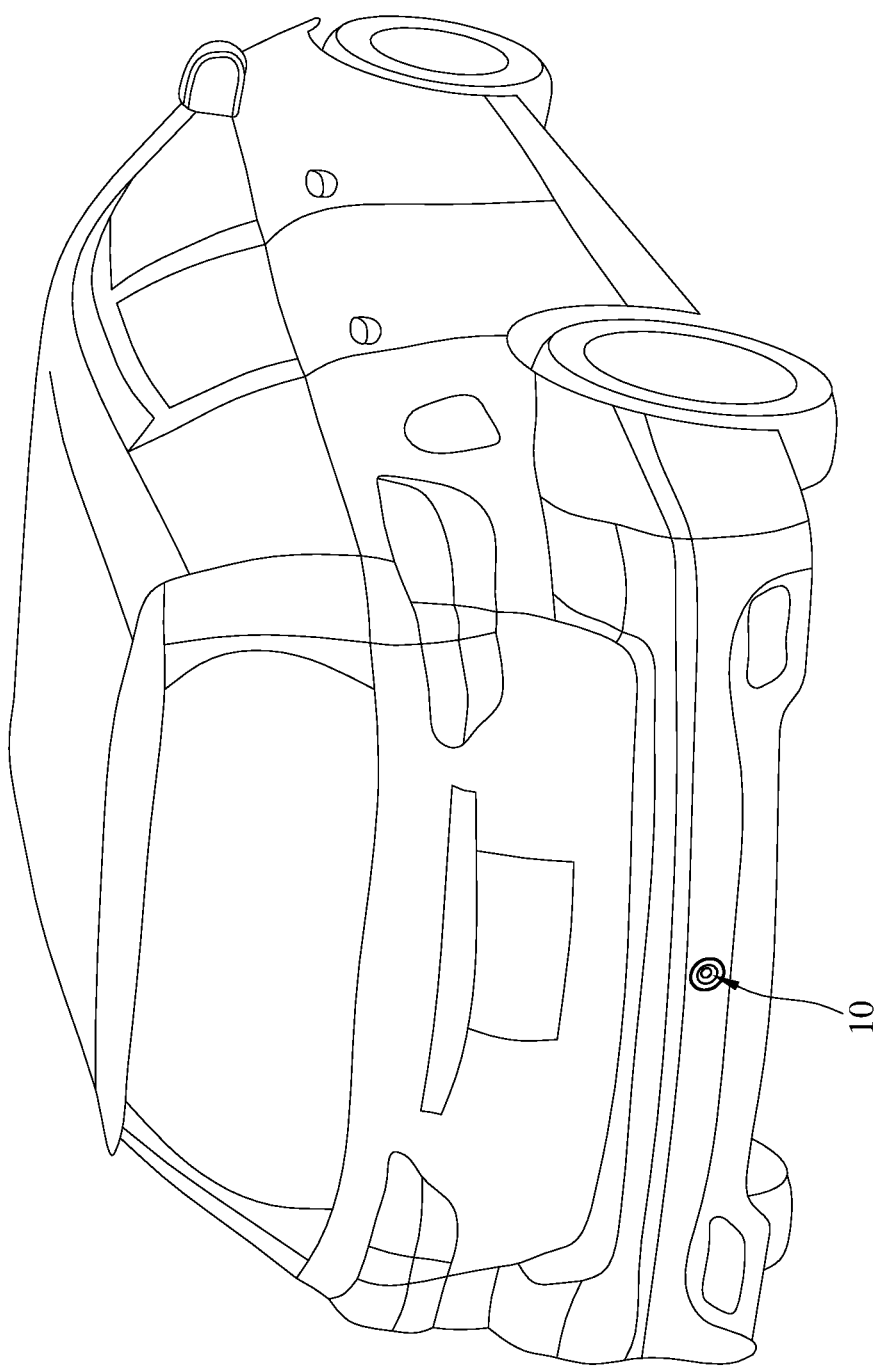
FIG. 22 shows an electronic device according to one embodiment.
Figure 23:
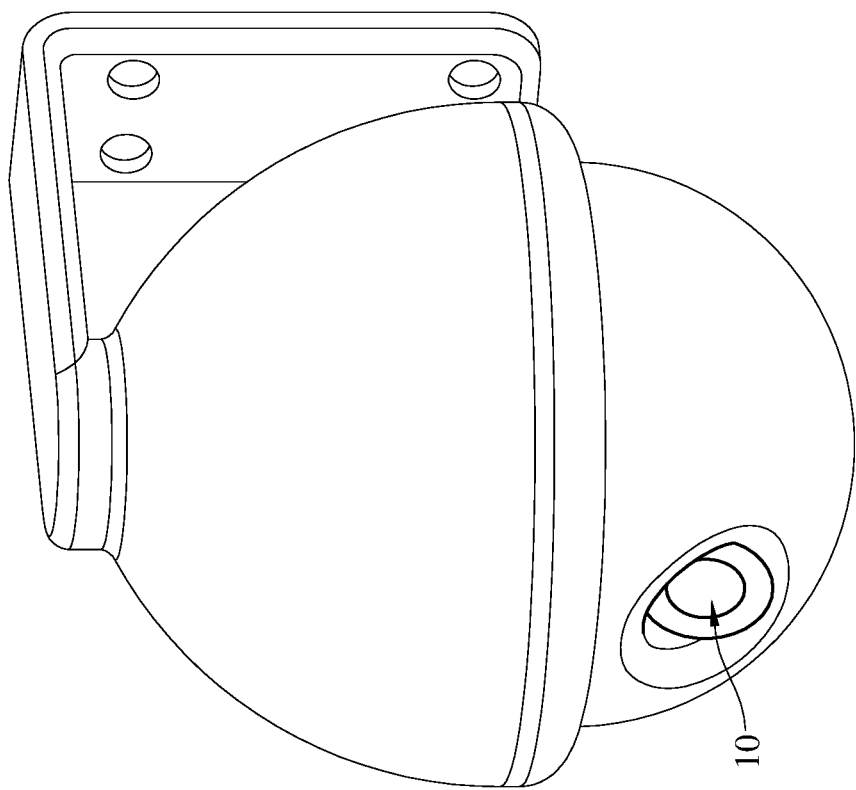
FIG. 23 shows an electronic device according to another embodiment.
Figure 24:
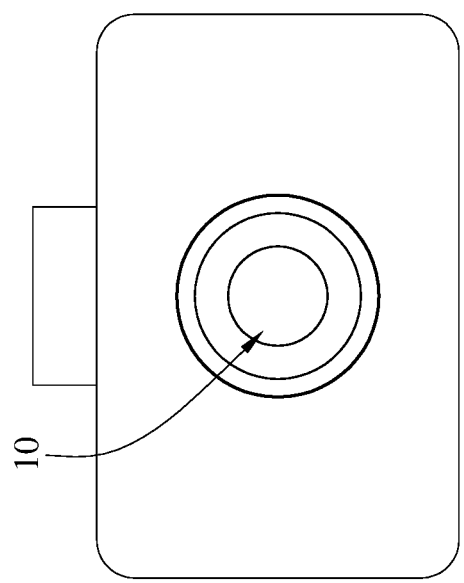
FIG. 24 shows an electronic device according to still another embodiment.

In FIG. 22, FIG. 23 and FIG. 24, an image capturing unit 10 may be installed in, but not limited to, an electronic device, including a vehicle backup camera (FIG. 22), a surveillance device (FIG. 23) or a dashboard camera (FIG. 24). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the imaging optical lens assembly can be optionally applied to optical systems with a movable focus. Furthermore, the imaging optical lens assembly is featured with good capability in aberration corrections and high image quality, and can be applied to 3D (three-dimensional) image capturing applications, in products such as such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
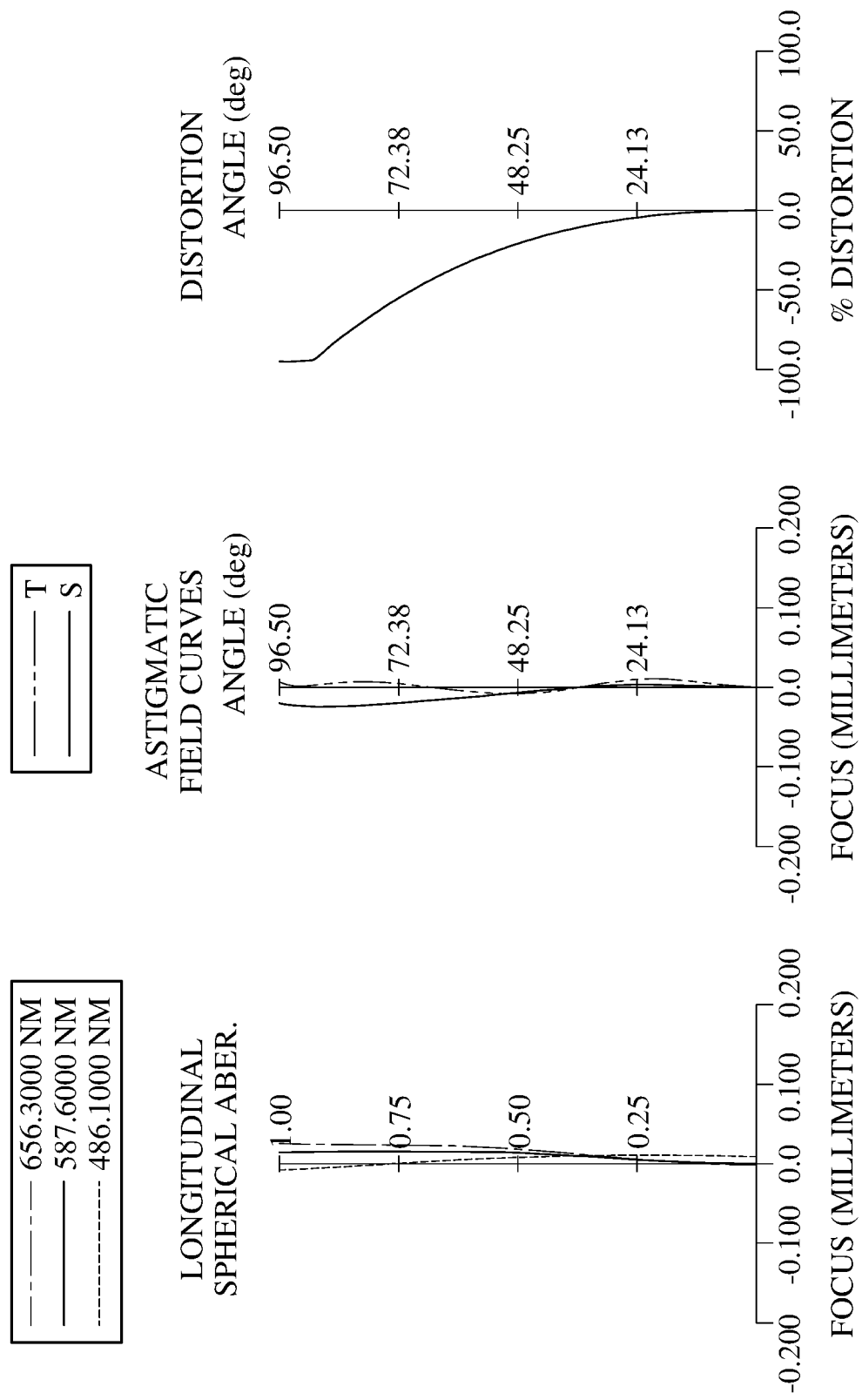
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens assembly (its reference numeral is omitted) of the present disclosure and an image sensor 190. The imaging optical lens assembly includes, in order from an object side to an image side, a first lens element 110, a second lens element 120, a third lens element 130, a fourth lens element 140, an aperture stop 100, a fifth lens element 150, a sixth lens element 160, an IR-cut filter 170, a cover-glass 175 and an image surface 180, wherein the imaging optical lens assembly has a total of six lens elements (110-160), and the fifth lens element 150 and the sixth lens element 160 are cemented together.

The first lens element 110 with negative refractive power has an object-side surface 111 being convex in a paraxial region thereof and an image-side surface 112 being concave in a paraxial region thereof. The first lens element 110 is made of glass material and has the object-side surface 111 and the image-side surface 112 being both spherical.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric. The image-side surface 132 of the third lens element 130 has at least one inflection point.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric.

In this embodiment, the image-side surface 152 of the fifth lens element 150 and the object-side surface 161 of the sixth lens element 160 are cemented together.

The IR-cut filter 170 and the cover-glass 175 both are made of glass material and located between the sixth lens element 160 and the image surface 180, and will not affect the focal length of the imaging optical lens assembly. The image sensor 190 is disposed on or near the image surface 180 of the imaging optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging optical lens assembly of the image capturing unit according to the 1st embodiment, when a focal length of the imaging optical lens assembly is f, an f-number of the imaging optical lens assembly is Fno, and half of a maximal field of view of the imaging optical lens assembly is HFOV, these parameters have the following values: f=1.05 millimeters (mm); Fno=2.00; and HFOV=96.5 degrees (deg.).

When half of the maximal field of view of the imaging optical lens assembly is HFOV, the following condition is satisfied: |1/tan(HFOV)|=0.11.

When a central thickness of the second lens element 120 is CT2, an axial distance between the second lens element 120 and the third lens element 130 is T23, the following condition is satisfied: T23/CT2=1.67.

When a central thickness of the fifth lens element 150 is CT5, a central thickness of the sixth lens element 160 is CT6, the following condition is satisfied: CT6/CT5=2.60.

When an entrance pupil diameter of the imaging optical lens assembly is EPD, a curvature radius of the object-side surface 161 of the sixth lens element 160 is R11, the following condition is satisfied: |R11/EPD|=1.00.

When a curvature radius of the object-side surface 141 of the fourth lens element 140 is R7, a curvature radius of the image-side surface 142 of the fourth lens element 140 is R8, the following condition is satisfied: |R7/R8|=0.91.

When a curvature radius of the object-side surface 131 of the third lens element 130 is R5, a curvature radius of the image-side surface 132 of the third lens element 130 is R6, the following condition is satisfied: (R5+R6)/(R5−R6)=−0.74.

When a curvature radius of the object-side surface 161 of the sixth lens element 160 is R11, a curvature radius of the image-side surface 162 of the sixth lens element 160 is R12, the following condition is satisfied: (R11−R12)/(R11+R12)=−1.69.

When a curvature radius of the object-side surface 151 of the fifth lens element 150 is R9, the curvature radius of the image-side surface 162 of the sixth lens element 160 is R12, the following condition is satisfied: (R9+R12)/(R9−R12)=0.13.

When the focal length of the imaging optical lens assembly is f, an axial distance between the first lens element 110 and the second lens element 120 is T12, the following condition is satisfied: T12/f=1.66.

When the focal length of the imaging optical lens assembly is f, an axial distance between the object-side surface 111 of the first lens element 110 and the image surface 180 is TL, the following condition is satisfied: TL/f=11.28.

When a focal length of the first lens element 110 is f1, a focal length of the third lens element 130 is f3, the following condition is satisfied: f1/f3=1.71.

When the focal length of the imaging optical lens assembly is f, the focal length of the first lens element 110 is f1, a focal length of the second lens element 120 is f2, the focal length of the third lens element 130 is f3, a focal length of the fourth lens element 140 is f4, a focal length of the fifth lens element 150 is f5, a focal length of the sixth lens element 160 is f6, a focal length of the i-th lens element is fi, a sum of absolute values of ratios f/fi is Σ|f/fi|, the following condition is satisfied: Σ|f/fi|=3.05, wherein i=1, 2, 3, 4, 5, 6.

When a maximum image height of the imaging optical lens assembly is ImgH, an axial distance between the object-side surface 111 of the first lens element 110 and the image-side surface 162 of the sixth lens element 160 is Td, the following condition is satisfied: Td/ImgH=5.38.

When a maximum effective radius of the object-side surface 111 of the first lens element 110 is Y11, a maximum effective radius of the image-side surface 162 of the sixth lens element 160 is Y62, the following condition is satisfied: |Y62/Y11|=0.24.

The detailed optical data of the 1st embodiment are shown in Table 1 and the aspheric surface data are shown in Table 2 below.

TABLE 1

1st Embodiment
f = 1.05 mm, Fno = 2.00, HFOV = 96.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 13.030 | | 1.050 | Glass | 1.589 | 61.3 | −6.67 |
| 2 | | 2.930 | | 1.734 | | | | |
| 3 | Lens 2 | 19.129 | (ASP) | 0.700 | Plastic | 1.535 | 55.8 | −2.65 |
| 4 | | 1.301 | (ASP) | 1.169 | | | | |
| 5 | Lens 3 | −2.421 | (ASP) | 0.650 | Plastic | 1.535 | 55.8 | −3.90 |
| 6 | | 16.459 | (ASP) | 0.095 | | | | |
| 7 | Lens 4 | 2.189 | (ASP) | 1.191 | Plastic | 1.583 | 30.2 | 2.17 |
| 8 | | −2.404 | (ASP) | −0.029 | | | | |
| 9 | Ape. Stop | Plano | | 0.150 | | | | |
| 10 | Lens 5 | 2.672 | (ASP) | 0.831 | Plastic | 1.639 | 23.5 | −1.31 |
| 11 | | 0.560 | (ASP) | 0.010 | Cemented | 1.514 | 38.8 | |
| 12 | Lens 6 | 0.523 | (ASP) | 2.160 | Plastic | 1.535 | 55.8 | 1.10 |
| 13 | | −2.045 | (ASP) | 0.800 | | | | |
| 14 | IR-cut filter | Plano | | 0.300 | Glass | 1.517 | 64.2 | — |
| 15 | | Plano | | 0.200 | | | | |
| 16 | cover-glass | Plano | | 0.400 | Glass | 1.517 | 64.2 | |
| 17 | | Plano | | 0.396 | | | | |
| 18 | Image | Plano | | — | | | | |

Note:
Reference wavelength is 587.6 nm (d-line).

TABLE 2

Aspheric Coefficients

| | Surface # | | | | |
|---|---|---|---|---|---|
| | 3 | 4 | 5 | 6 | 7 |
| k = | −8.3083E+01 | −9.7500E−02 | −7.9548E+00 | −2.5526E+01 | −8.7862E−01 |
| A4 = | −2.2710E−04 | −4.5986E−02 | −1.8914E−01 | −1.3362E−01 | −3.6003E−02 |
| A6 = | 8.8119E−04 | −1.6728E−02 | 5.2716E−02 | 4.6510E−02 | 1.0795E−02 |

| | Surface # | | | | |
|---|---|---|---|---|---|
| | 8 | 10 | 11 | 12 | 13 |
| k = | −9.3984E+00 | −4.7899E−01 | −8.6590E−01 | −1.1602E+00 | −1.1732E+01 |
| A4 = | −7.0989E−03 | −2.3832E−02 | −5.6676E−01 | −1.0230E+00 | −1.1066E−01 |
| A6 = | −3.9076E−03 | −5.4666E−03 | 8.2305E−01 | 3.1383E+00 | 1.1440E−01 |
| A8 = | — | — | −9.7455E−01 | −4.3462E+00 | −7.2163E−02 |
| A10 = | — | — | 6.0386E−01 | 2.8781E+00 | 2.4733E−02 |
| A12 = | — | — | −1.5448E−01 | −7.3838E−01 | −3.7985E−03 |

In Table 1, the curvature radius, the thickness and the focal length are shown in millimeters (mm). Surface numbers 0-18 represent the surfaces sequentially arranged from the object-side to the image-side along the optical axis. In Table 2, k represents the conic coefficient of the equation of the aspheric surface profiles. A4-A12 represent the aspheric coefficients ranging from the 4th order to the 16th order. The tables presented below for each embodiment are related to the corresponding schematic and aberration curves figures in the drawing, and the definitions of the terms in the tables are the same as Table 1 and Table 2 of the 1st embodiment. Therefore, an explanation in this regard will not be provided again.

2nd Embodiment

Figure 3:
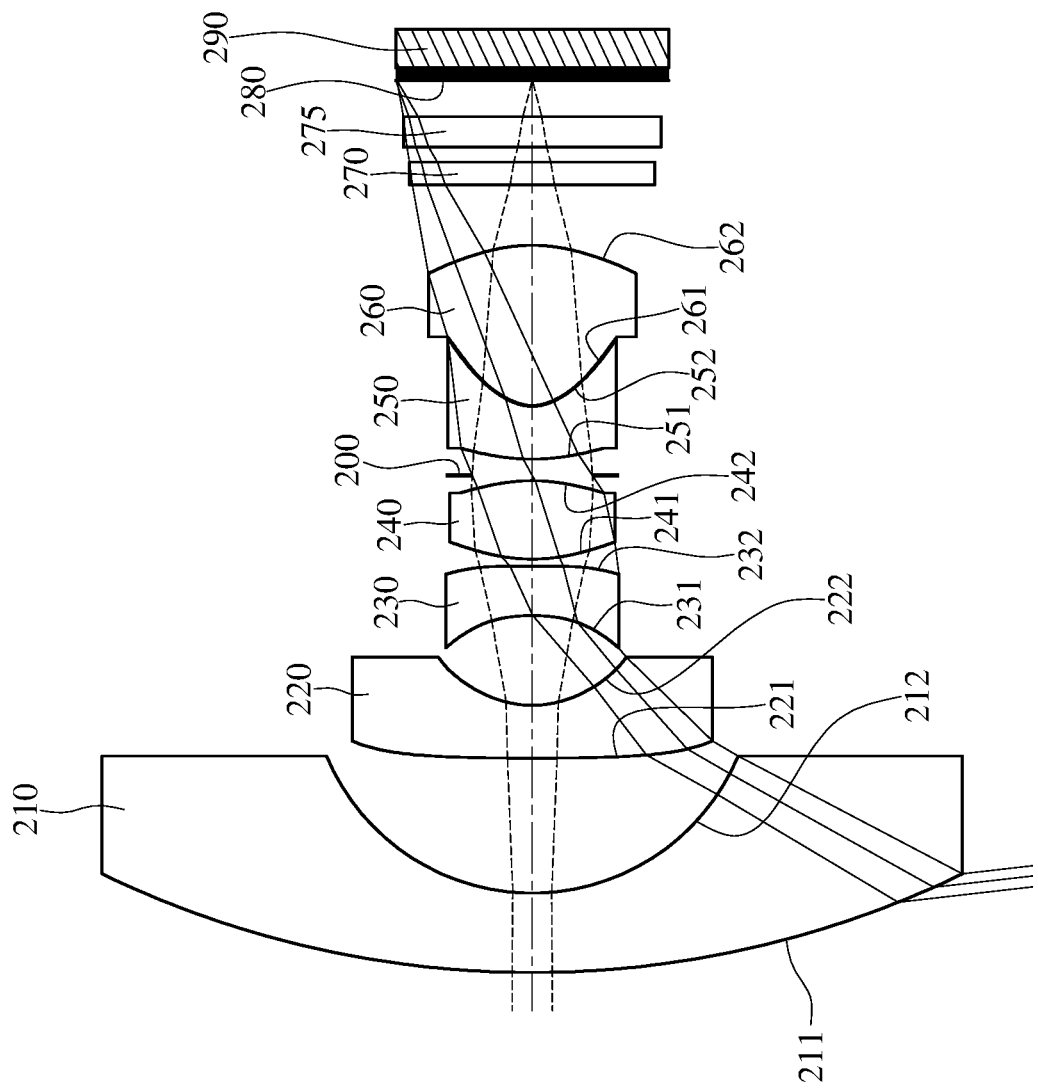
FIG. 3 is a schematic view of an image capturing unit according to the 2nd embodiment of the present disclosure.
Figure 4:
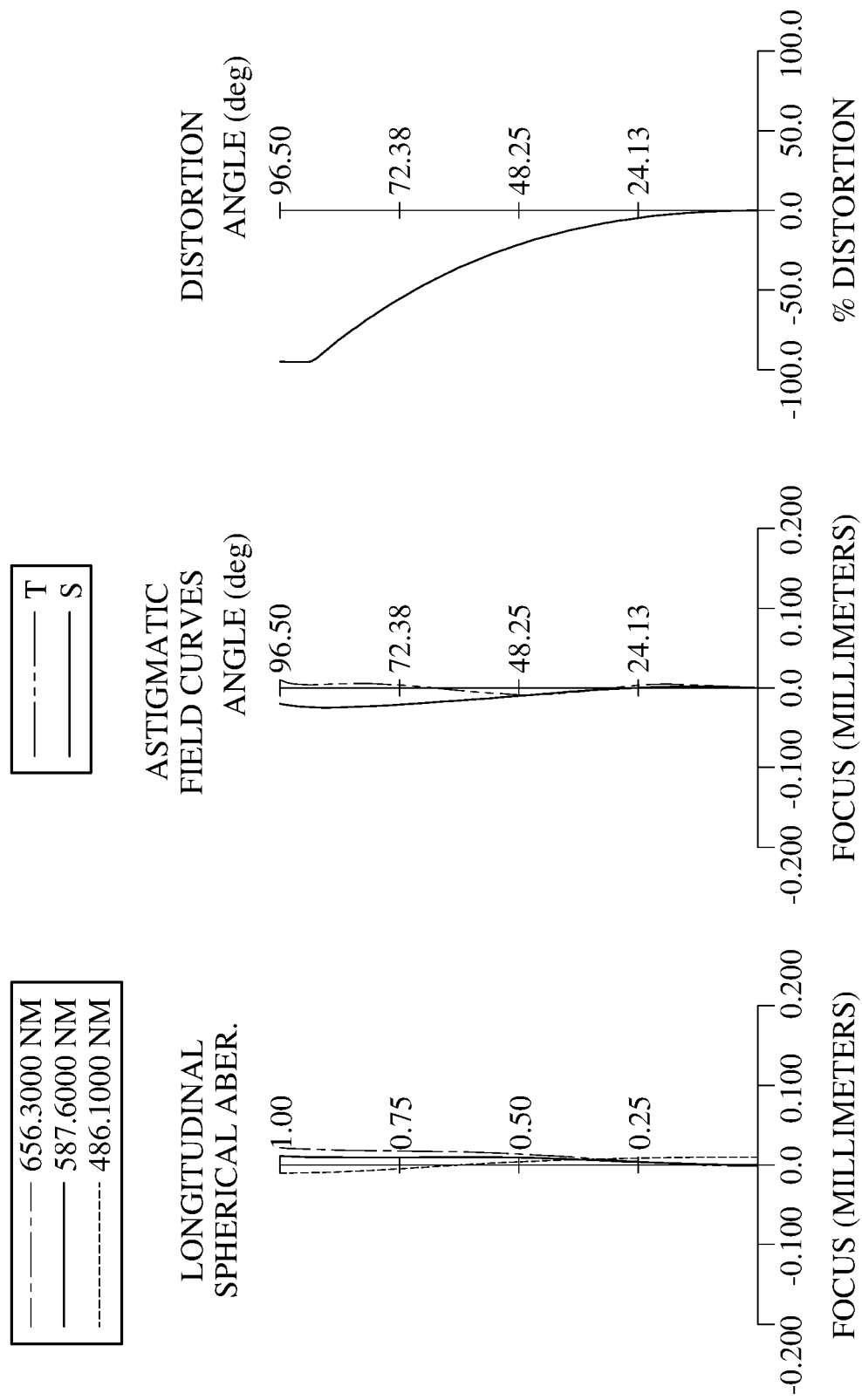
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging optical lens assembly (its reference numeral is omitted) of the present disclosure and an image sensor 290. The imaging optical lens assembly includes, in order from an object side to an image side, a first lens element 210, a second lens element 220, a third lens element 230, a fourth lens element 240, an aperture stop 200, a fifth lens element 250, a sixth lens element 260, an IR-cut filter 270, a cover-glass 275 and an image surface 280, wherein the imaging optical lens assembly has a total of six lens elements (210-260), and the fifth lens element 250 and the sixth lens element 260 are cemented together.

The first lens element 210 with negative refractive power has an object-side surface being 211 convex in a paraxial region thereof and an image-side surface 212 being concave in a paraxial region thereof. The first lens element 210 is made of glass material and has the object-side surface 211 and the image-side surface 212 being both spherical.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric. The image-side surface 232 of the third lens element 230 has at least one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric.

In this embodiment, the image-side surface 252 of the fifth lens element 250 and the object-side surface 261 of the sixth lens element 260 are cemented together.

The IR-cut filter 270 and the cover-glass 275 both are made of glass material and located between the sixth lens element 260 and the image surface 280, and will not affect the focal length of the imaging optical lens assembly. The image sensor 290 is disposed on or near the image surface 280 of the imaging optical lens assembly.

The detailed optical data of the 2nd embodiment are shown in Table 3 and the aspheric surface data are shown in Table 4 below.

TABLE 3

2nd Embodiment
f = 1.06 mm, Fno = 2.00, HFOV = 96.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 13.030 | 1.050 | Glass | 1.589 | 61.3 | −6.72 |
| 2 | | 2.945 | 1.785 | | | | |
| 3 | Lens 2 | 38.615 (ASP) | 0.700 | Plastic | 1.535 | 55.8 | −2.68 |
| 4 | | 1.371 (ASP) | 1.188 | | | | |
| 5 | Lens 3 | −2.305 (ASP) | 0.650 | Plastic | 1.535 | 55.8 | −3.83 |
| 6 | | 20.000 (ASP) | 0.096 | | | | |
| 7 | Lens 4 | 2.243 (ASP) | 1.038 | Plastic | 1.583 | 30.2 | 2.12 |
| 8 | | −2.288 (ASP) | 0.070 | | | | |
| 9 | Ape. Stop | Plano | 0.215 | | | | |
| 10 | Lens 5 | 2.777 (ASP) | 0.699 | Plastic | 1.639 | 23.5 | −1.30 |
| 11 | | 0.578 (ASP) | 0.010 | Cemented | 1.514 | 38.8 | |
| 12 | Lens 6 | 0.542 (ASP) | 2.120 | Plastic | 1.535 | 55.8 | 1.12 |
| 13 | | −2.120 (ASP) | 0.800 | | | | |
| 14 | IR-cut filter | Plano | 0.300 | Glass | 1.517 | 64.2 | — |
| 15 | | Plano | 0.200 | | | | |
| 16 | cover-glass | Plano | 0.400 | Glass | 1.517 | 64.2 | |
| 17 | | Plano | 0.481 | | | | |
| 18 | Image | Plano | — | | | | |

Note:
Reference wavelength is 587.6 nm (d-line).

TABLE 4

Aspheric Coefficients

| Surface # | 3 | 4 | 5 | 6 | 7 |
|---|---|---|---|---|---|
| k = | 5.1973E+01 | −1.0911E−02 | −6.6135E+00 | 8.0019E+01 | −1.0174E+00 |
| A4 = | 7.7033E−04 | −3.9849E−02 | −1.8397E−01 | −1.3373E−01 | −3.4727E−02 |
| A6 = | 6.9409E−04 | −1.3512E−02 | 4.8583E−02 | 4.0194E−02 | 7.2045E−03 |

| Surface # | 8 | 10 | 11 | 12 | 13 |
|---|---|---|---|---|---|
| k = | −7.3486E+00 | 6.7376E−03 | −8.5285E−01 | −1.0846E+00 | −1.1732E+01 |
| A4 = | 5.1051E−03 | −2.2498E−02 | −5.0621E−01 | −9.4166E−01 | −1.0554E−01 |
| A6 = | −7.9234E−03 | −3.9454E−03 | 6.5673E−01 | 2.5888E+00 | 1.1353E−01 |
| A8 = | — | — | −7.2263E−01 | −3.3215E+00 | −7.5761E−02 |
| A10 = | — | — | 4.1633E−01 | 2.0647E+00 | 2.8205E−02 |
| A12 = | — | — | −1.0131E−01 | −5.0687E−01 | −4.6710E−03 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.06 | (R11 − R12)/(R11 + R12) | −1.69 |
| Fno | 2.00 | (R9 + R12)/(R9 − R12) | 0.13 |
| HFOV [deg.] | 96.5 | T12/f | 1.68 |
| \|1/tan(HFOV)\| | 0.11 | TL/f | 11.13 |
| T23/CT2 | 1.70 | f1/f3 | 1.76 |
| CT6/CT5 | 3.03 | Σ\|f/fi\| | 3.09 |
| \|R11/EPD\| | 1.00 | Td/ImgH | 5.33 |
| \|R7/R8\| | 0.98 | \|Y62/Y11\| | 0.24 |
| (R5 + R6)/(R5 − R6) | −0.79 | — | — |

3rd Embodiment

Figure 5:
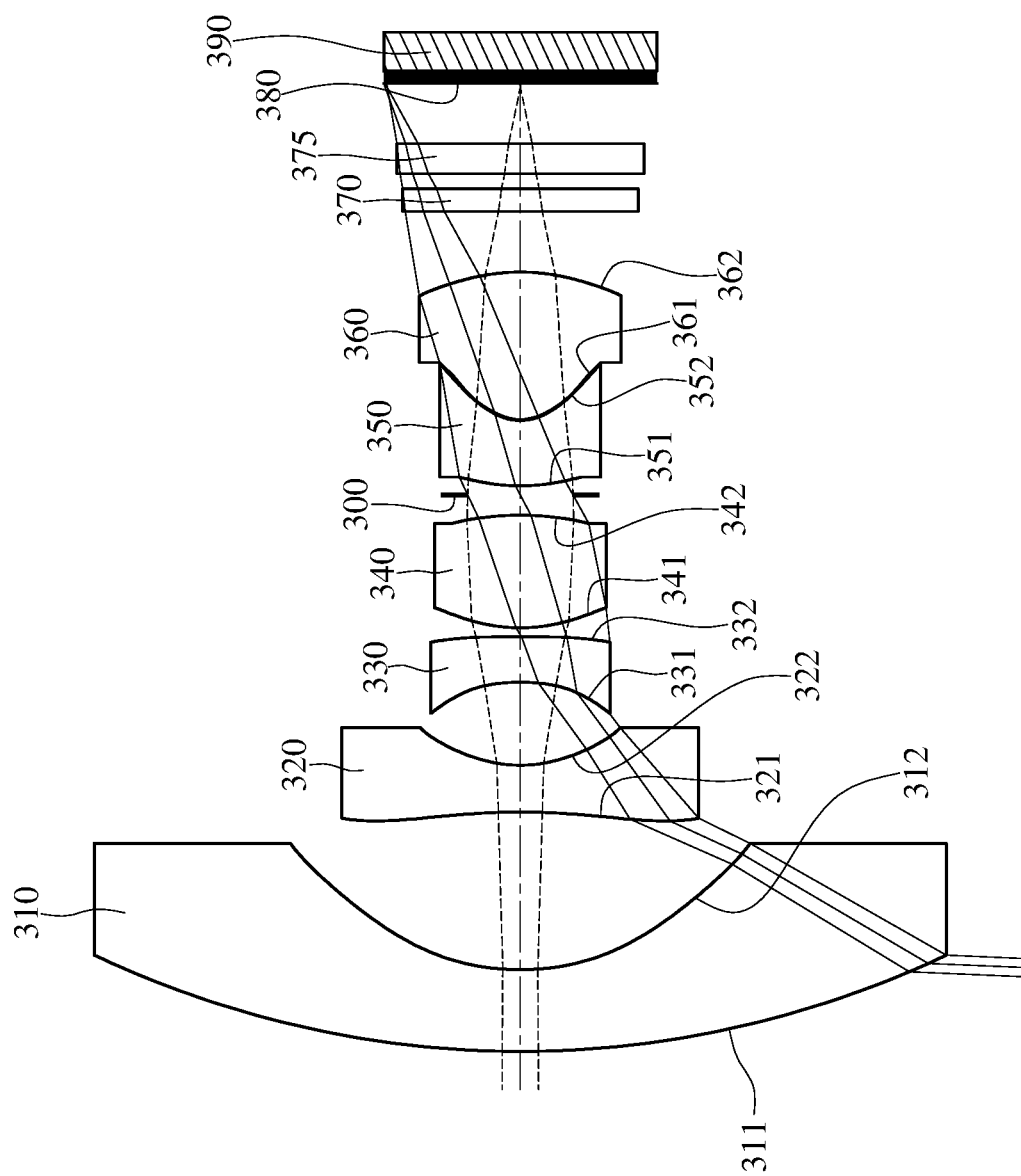
FIG. 5 is a schematic view of an image capturing unit according to the 3rd embodiment of the present disclosure.
Figure 6:
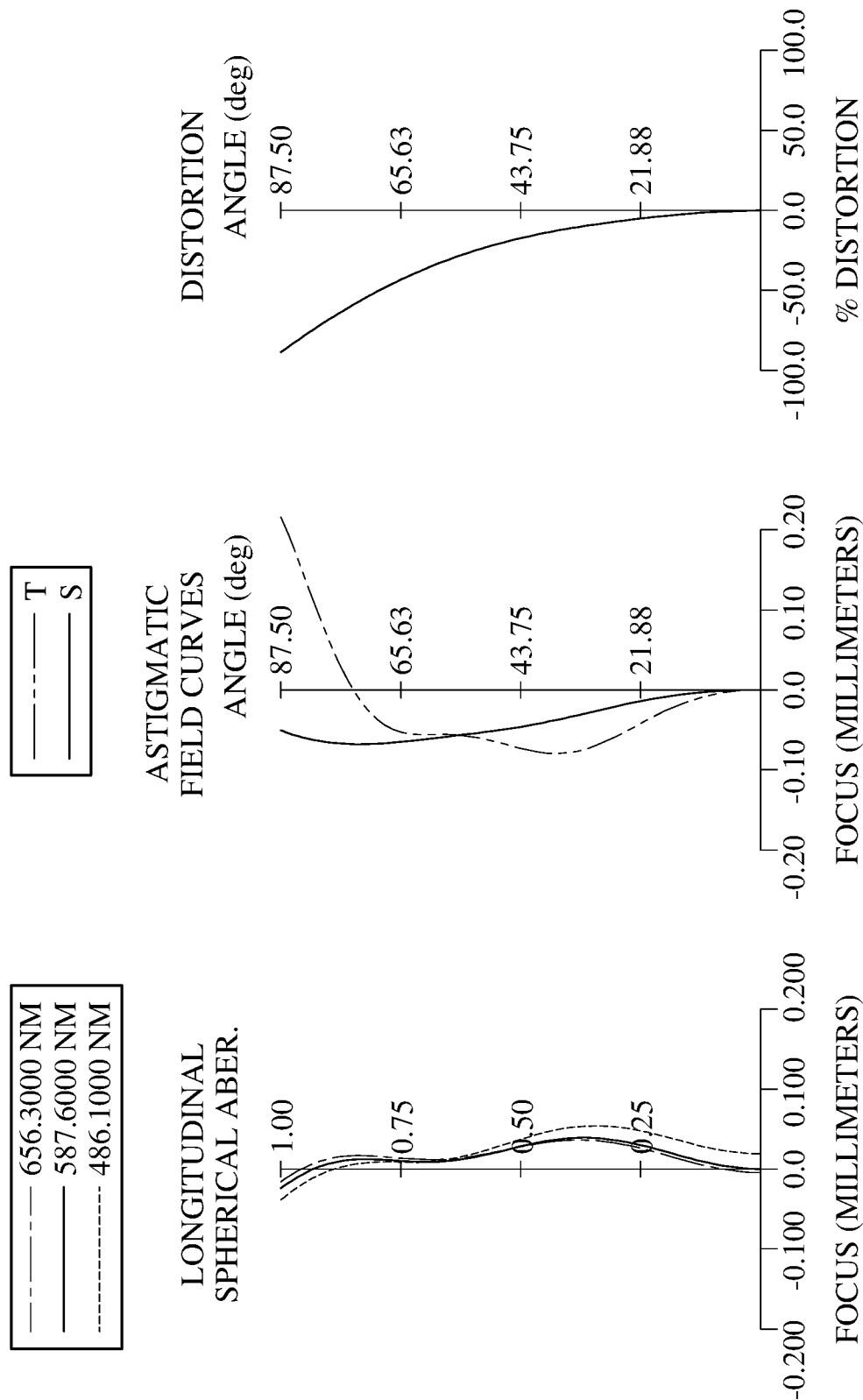
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens assembly (its reference numeral is omitted) of the present disclosure and an image sensor 390. The imaging optical lens assembly includes, in order from an object side to an image side, a first lens element 310, a second lens element 320, a third lens element 330, a fourth lens element 340, an aperture stop 300, a fifth lens element 350, a sixth lens element 360, an IR-cut filter 370, a cover-glass 375 and an image surface 380, wherein the imaging optical lens assembly has a total of six lens elements (310-360), and the fifth lens element 350 and the sixth lens element 360 are cemented together.

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has at least one inflection point.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric. The image-side surface 332 of the third lens element 330 has at least one inflection point.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric.

In this embodiment, the image-side surface 352 of the fifth lens element 350 and the object-side surface 361 of the sixth lens element 360 are cemented together.

The IR-cut filter 370 and the cover-glass 375 both are made of glass material and located between the sixth lens element 360 and the image surface 380, and will not affect the focal length of the imaging optical lens assembly. The image sensor 390 is disposed on or near the image surface 380 of the imaging optical lens assembly.

The detailed optical data of the 3rd embodiment are shown in Table 5 and the aspheric surface data are shown in Table 6 below.

TABLE 5

3rd Embodiment
f = 1.17 mm, Fno = 2.45, HFOV = 87.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 12.774 (ASP) | 1.081 | Plastic | 1.544 | 55.9 | −8.53 |
| 2 | | 3.301 (ASP) | 2.087 | | | | |
| 3 | Lens 2 | −8.333 (ASP) | 0.618 | Plastic | 1.583 | 30.2 | −2.3 |
| 4 | | 1.644 (ASP) | 1.099 | | | | |
| 5 | Lens 3 | −2.818 (ASP) | 0.600 | Plastic | 1.544 | 55.9 | −4.96 |
| 6 | | 66.662 (ASP) | 0.120 | | | | |
| 7 | Lens 4 | 2.241 (ASP) | 1.490 | Plastic | 1.583 | 30.2 | 2.62 |
| 8 | | −3.635 (ASP) | 0.267 | | | | |
| 9 | Ape. Stop | Plano | 0.121 | | | | |
| 10 | Lens 5 | 2.480 (ASP) | 0.866 | Plastic | 1.639 | 23.3 | −1.62 |
| 11 | | 0.631 (ASP) | 0.010 | Cemented | 1.514 | 38.8 | |

TABLE 5-continued

3rd Embodiment
f = 1.17 mm, Fno = 2.45, HFOV = 87.5 deg.

| Surface # | | Curvature Radius | Thickness | Material | Index | Abbe # | Focal Length |
|---|---|---|---|---|---|---|---|
| 12 | Lens 6 | 0.600 (ASP) | 1.953 | Plastic | 1.544 | 55.9 | 1.14 |
| 13 | | −2.558 (ASP) | 0.800 | | | | |
| 14 | IR-cut filter | Plano | 0.300 | Glass | 1.517 | 64.2 | — |
| 15 | | Plano | 0.200 | | | | |
| 16 | cover-glass | Plano | 0.400 | Glass | 1.517 | 64.2 | |
| 17 | | Plano | 0.794 | | | | |
| 18 | Image | Plano | — | | | | |

Note:
Reference wavelength is 587.6 nm (d-line).

TABLE 6

| | | | Aspheric Coefficients | | | |
|---|---|---|---|---|---|---|
| Surface # | 1 | 2 | 3 | 4 | 5 | 6 |
| k = | 5.1796E−01 | −4.5196E−02 | −9.2518E+00 | 2.4749E−01 | −8.1481E+00 | 7.6168E+01 |
| A4 = | −6.6559E−05 | 9.0914E−03 | 3.9039E−03 | −1.4189E−01 | −1.9322E−01 | −8.7966E−02 |
| A6 = | −7.5599E−07 | −1.9595E−03 | 8.4764E−04 | 1.2845E−01 | 5.2857E−02 | 5.5359E−02 |
| A8 = | 1.6617E−08 | 6.7865E−05 | −9.1840E−05 | −8.5099E−02 | 2.3235E−02 | −1.5005E−02 |
| A10 = | — | — | 5.5381E−06 | 1.8465E−02 | −1.3423E−02 | −1.0201E−03 |

| Surface # | 7 | 8 | 10 | 11 | 12 | 13 |
|---|---|---|---|---|---|---|
| k = | −6.8040E−01 | −2.3534E+01 | −8.8079E−01 | −8.5377E−01 | −1.3932E+00 | −1.2849E+01 |
| A4 = | 2.3049E−03 | −2.9902E−02 | −7.4253E−02 | −2.6415E−01 | −1.7272E−01 | −5.3799E−02 |
| A6 = | −7.6751E−03 | 2.3085E−02 | 4.0193E−01 | −3.3960E−02 | −3.0255E−01 | 9.5972E−03 |
| A8 = | −6.2785E−03 | −4.1669E−02 | −1.4398E+00 | 6.8664E−01 | 2.6177E+00 | 2.0605E−02 |
| A10 = | 6.2986E−04 | 1.7787E−02 | 2.2492E+00 | −9.7798E−01 | −3.4665E+00 | −1.2083E−02 |
| A12 = | — | — | −1.3054E+00 | 3.8828E−01 | 1.3313E+00 | 1.1335E−03 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.17 | (R11 − R12)/(R11 + R12) | −1.61 |
| Fno | 2.45 | (R9 + R12)/(R9 − R12) | −0.02 |
| HFOV [deg.] | 87.5 | T12/f | 1.78 |
| \|1/tan(HFOV)\| | 0.04 | TL/fs | 10.95 |
| T23/CT2 | 1.78 | f1/f3 | 1.72 |
| CT6/CT5 | 2.26 | Σ\|f/fi\| | 3.07 |
| \|R11/EPD\| | 1.26 | Td/ImgH | 5.72 |
| \|R7/R8\| | 0.62 | \|Y62/Y11\| | 0.24 |
| (R5 + R6)/(R5 − R6) | −0.92 | — | |

4th Embodiment

Figure 7:
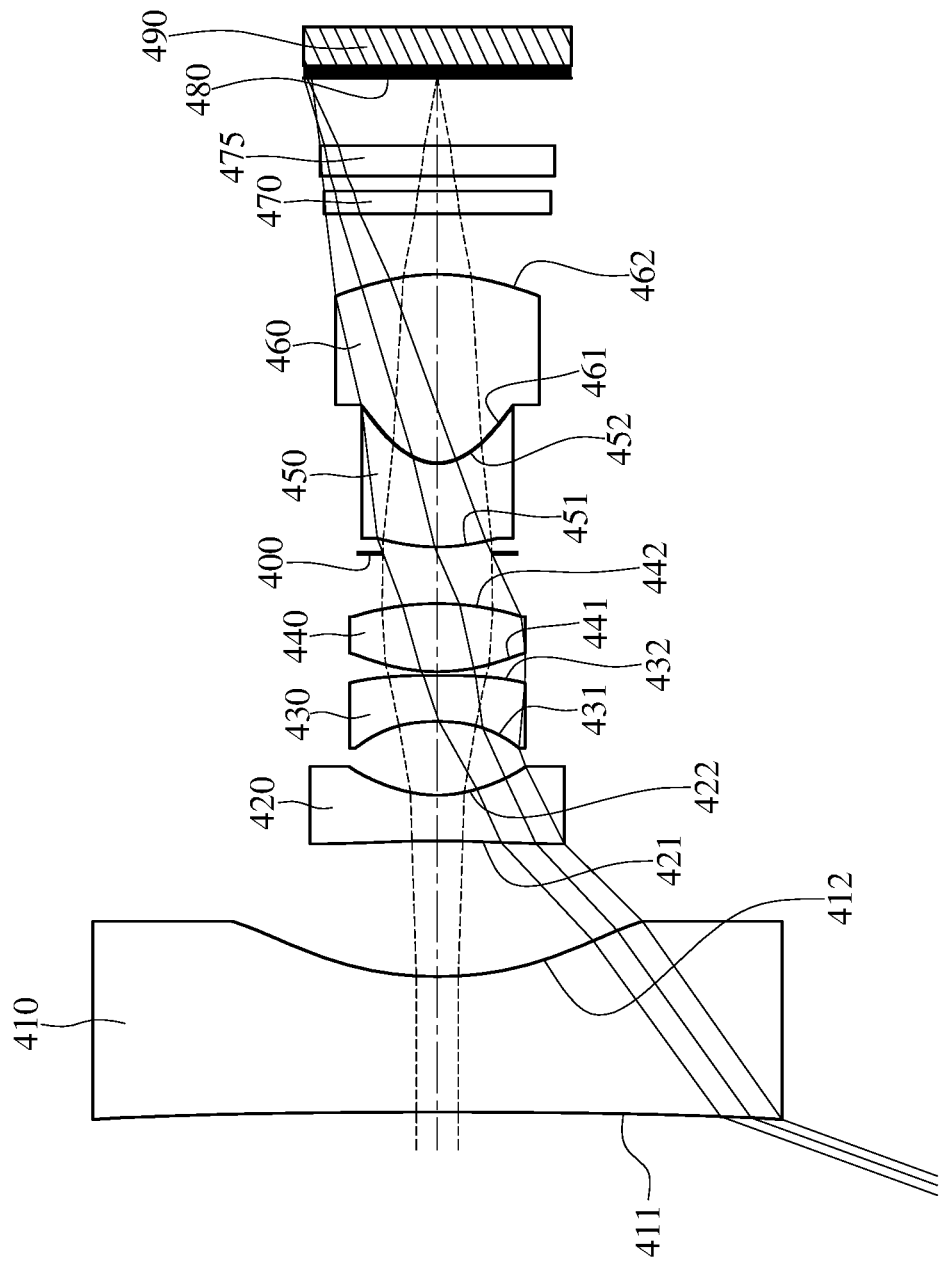
FIG. 7 is a schematic view of an image capturing unit according to the 4th embodiment of the present disclosure.
Figure 8:
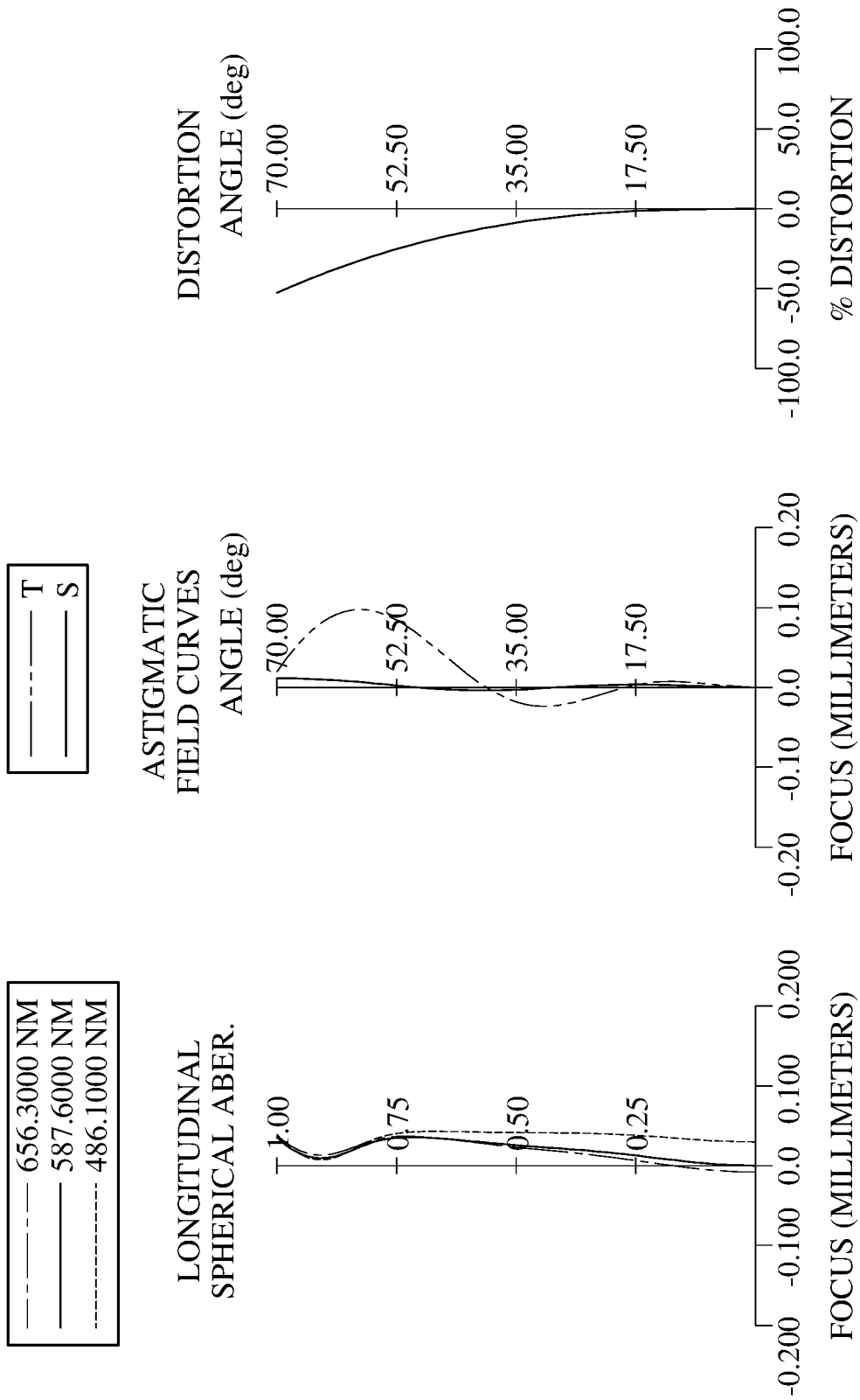
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging optical lens assembly (its reference numeral is omitted) of the present disclosure and an image sensor 490. The imaging optical lens assembly includes, in order from an object side to an image side, a first lens element 410, a second lens element 420, a third lens element 430, a fourth lens element 440, an aperture stop 400, a fifth lens element 450, a sixth lens element 460, an IR-cut filter 470, a cover-glass 475 and an image surface 480, wherein the imaging optical lens assembly has a total of six lens elements (410-460), and the fifth lens element 450 and the sixth lens element 460 are cemented together.

The first lens element 410 with negative refractive power has an object-side surface 411 being concave in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has at least one inflection point.

The third lens element 430 with negative refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric.

In this embodiment, the image-side surface 452 of the fifth lens element 450 and the object-side surface 461 of the sixth lens element 460 are cemented together.

The IR-cut filter 470 and the cover-glass 475 both are made of glass material and located between the sixth lens element 460 and the image surface 480, and will not affect the focal length of the imaging optical lens assembly. The image sensor 490 is disposed on or near the image surface 480 of the imaging optical lens assembly.

The detailed optical data of the 4th embodiment are shown in Table 7 and the aspheric surface data are shown in Table 8 below.

TABLE 7

4th Embodiment
f = 1.44 mm, Fno = 2.60, HFOV = 70.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −153.397 (ASP) | 1.794 | Plastic | 1.544 | 55.9 | −8.66 |
| 2 | | 4.902 (ASP) | 1.795 | | | | |
| 3 | Lens 2 | −12.473 (ASP) | 0.604 | Plastic | 1.583 | 30.2 | −2.34 |
| 4 | | 1.578 (ASP) | 0.976 | | | | |
| 5 | Lens 3 | −2.646 (ASP) | 0.608 | Plastic | 1.544 | 55.9 | −5.34 |
| 6 | | −30.705 (ASP) | 0.051 | | | | |
| 7 | Lens 4 | 2.542 (ASP) | 0.900 | Plastic | 1.583 | 30.2 | 2.64 |
| 8 | | −3.481 (ASP) | 0.667 | | | | |
| 9 | Ape. Stop | Plano | 0.082 | | | | |
| 10 | Lens 5 | 2.437 (ASP) | 1.102 | Plastic | 1.639 | 23.5 | −1.61 |
| 11 | | 0.598 (ASP) | 0.010 | Cemented | 1.514 | 38.8 | |
| 12 | Lens 6 | 0.556 (ASP) | 2.496 | Plastic | 1.544 | 55.9 | 1.17 |
| 13 | | −2.485 (ASP) | 0.800 | | | | |
| 14 | IR-cut filter | Plano | 0.300 | Glass | 1.517 | 64.2 | — |
| 15 | | Plano | 0.200 | | | | |
| 16 | cover-glass | Plano | 0.400 | Glass | 1.517 | 64.2 | |
| 17 | | Plano | 0.896 | | | | |
| 18 | Image | Plano | — | | | | |

Note:
Reference wavelength is 587.6 nm (d-line).

TABLE 8

Aspheric Coefficients

| Surface # | 1 | 2 | 3 | 4 | 5 | 6 |
|---|---|---|---|---|---|---|
| k = | 2.1300E+01 | −6.4080E−02 | −7.0777E+00 | 2.1377E−01 | −6.9223E+00 | 7.7932E+01 |
| A4 = | −5.3702E−05 | 6.1866E−03 | 1.6477E−02 | −1.5532E−01 | −1.9696E−01 | −8.2747E−02 |
| A6 = | −4.8497E−07 | −1.3596E−03 | −4.2308E−03 | 1.4279E−01 | 4.5184E−02 | 5.2256E−02 |
| A8 = | −3.7403E−09 | 4.2334E−05 | 6.4613E−04 | −1.1174E−01 | 5.1805E−02 | −2.0191E−02 |
| A10 = | — | — | −4.1568E−05 | 3.1052E−02 | −3.2080E−02 | 2.5532E−03 |

TABLE 8-continued

Aspheric Coefficients

| Surface # | 7 | 8 | 10 | 11 | 12 | 13 |
|---|---|---|---|---|---|---|
| k = | 5.6170E−02 | −2.1137E+01 | −7.5257E−01 | −8.4736E−01 | −1.3887E+00 | −1.2986E+01 |
| A4 = | 3.0584E−03 | −4.9206E−02 | −4.4744E−02 | −3.0613E−01 | −6.8637E−01 | −3.0906E−02 |
| A6 = | −1.1460E−02 | 4.6971E−02 | 7.5785E−02 | 2.9385E−01 | 3.1065E+00 | 2.7998E−04 |
| A8 = | −1.0293E−03 | −3.2837E−02 | −3.7565E−01 | −1.3220E−01 | −4.8724E+00 | 1.6576E−02 |
| A10 = | −1.6368E−03 | 5.7262E−03 | 8.4748E−01 | −6.7252E−02 | 3.3798E+00 | −8.8032E−03 |
| A12 = | — | — | −6.5916E−01 | 2.2056E−02 | −8.8509E−01 | 9.5231E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.44 | (R11 − R12)/(R11 + R12) | −1.58 |
| Fno | 2.60 | (R9 + R12)/(R9 − R12) | −0.01 |
| HFOV [deg.] | 70.0 | T12/f | 1.25 |
| |1/tan(HFOV)| | 0.36 | TL/f | 9.50 |
| T23/CT2 | 1.62 | f1/f3 | 1.62 |
| CT6/CT5 | 2.26 | Σ|f/fi| | 3.72 |
| |R11/EPD| | 1.00 | Td/ImgH | 6.29 |
| |R7/R8| | 0.73 | |Y62/Y11| | 0.30 |
| (R5 + R6)/(R5 − R6) | −1.19 | — | — |

5th Embodiment

Figure 9:
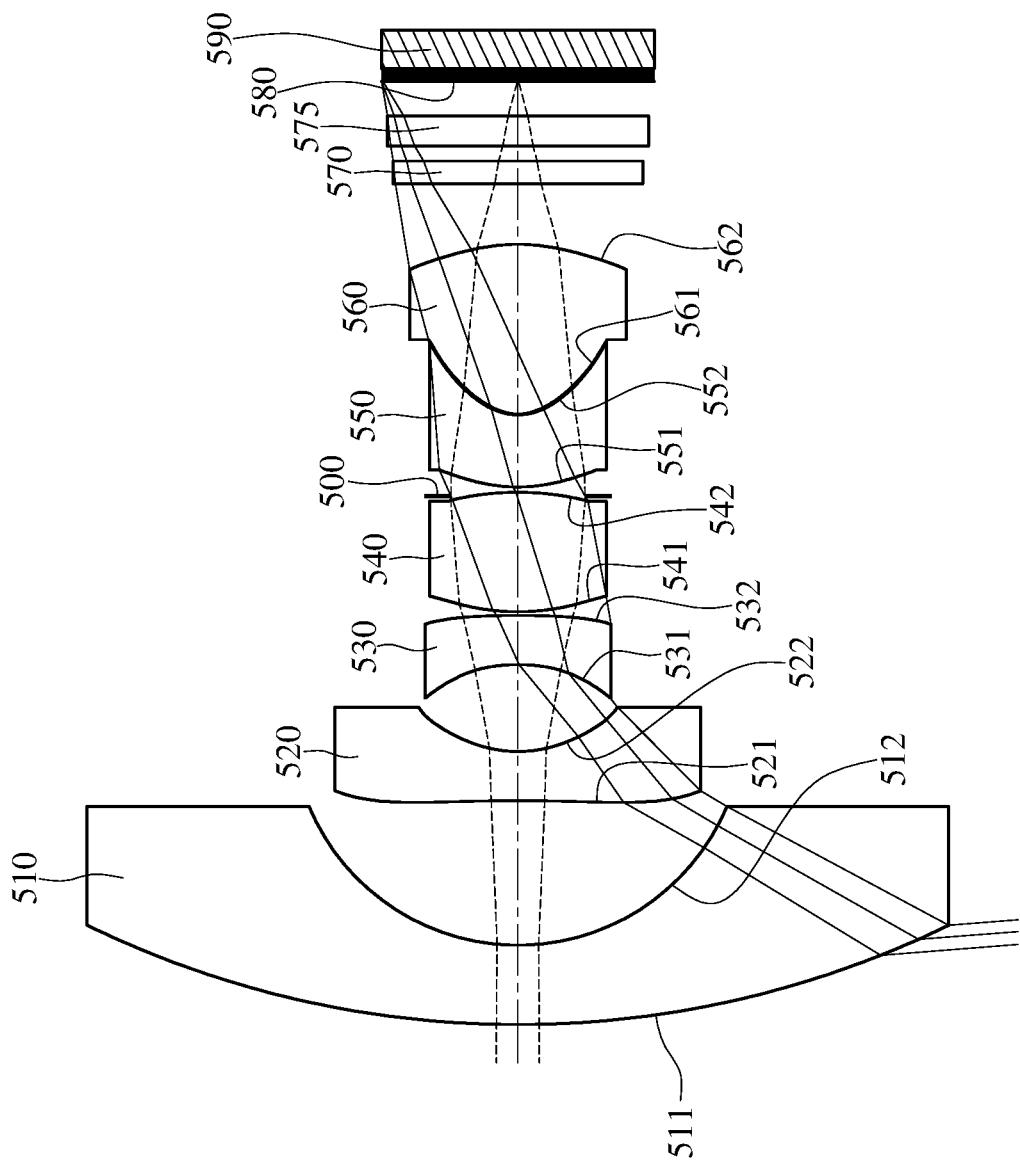
FIG. 9 is a schematic view of an image capturing unit according to the 5th embodiment of the present disclosure.
Figure 10:
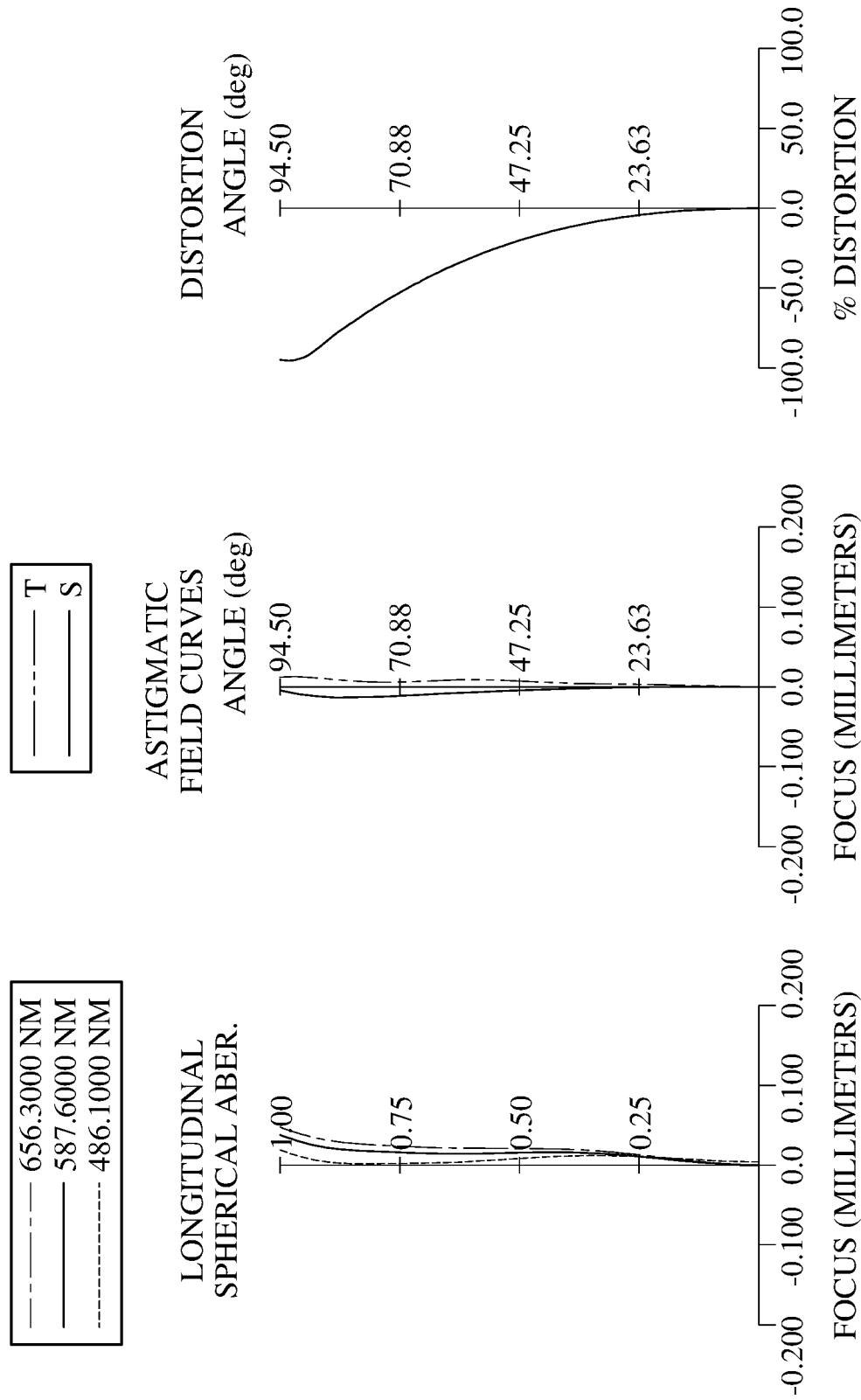
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens assembly (its reference numeral is omitted) of the present disclosure and an image sensor 590. The imaging optical lens assembly includes, in order from an object side to an image side, a first lens element 510, a second lens element 520, a third lens element 530, a fourth lens element 540, an aperture stop 500, a fifth lens element 550, a sixth lens element 560, an IR-cut filter 570, a cover-glass 575 and an image surface 580, wherein the imaging optical lens assembly has a total of six lens elements (510-560), and the fifth lens element 550 and the sixth lens element 560 are cemented together.

The first lens element 510 with negative refractive power has an object-side surface being 511 convex in a paraxial region thereof and an image-side surface 512 being concave in a paraxial region thereof. The first lens element 510 is made of glass material and has the object-side surface 511 and the image-side surface 512 being both spherical.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has at least one inflection point.

The third lens element 530 with negative refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric.

In this embodiment, the image-side surface 552 of the fifth lens element 550 and the object-side surface 561 of the sixth lens element 560 are cemented together.

The IR-cut filter 570 and the cover-glass 575 both are made of glass material and located between the sixth lens element 560 and the image surface 580, and will not affect the focal length of the imaging optical lens assembly. The image sensor 590 is disposed on or near the image surface 580 of the imaging optical lens assembly.

The detailed optical data of the 5th embodiment are shown in Table 9 and the aspheric surface data are shown in Table 10 below.

TABLE 9

5th Embodiment
f = 1.08 mm, Fno = 1.90, HFOV = 94.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 12.980 | 1.050 | Glass | 1.589 | 61.3 | −6.88 |
| 2 | | 2.996 | 1.912 | | | | |
| 3 | Lens 2 | −23.584 (ASP) | 0.650 | Plastic | 1.544 | 55.9 | −2.7 |
| 4 | | 1.578 (ASP) | 1.150 | | | | |
| 5 | Lens 3 | −2.515 (ASP) | 0.650 | Plastic | 1.544 | 55.9 | −5.36 |
| 6 | | −20.061 (ASP) | 0.050 | | | | |
| 7 | Lens 4 | 3.096 (ASP) | 1.580 | Plastic | 1.583 | 30.2 | 3.24 |
| 8 | | −3.931 (ASP) | −0.050 | | | | |
| 9 | Ape. Stop | Plano | 0.120 | | | | |
| 10 | Lens 5 | 2.062 (ASP) | 0.954 | Plastic | 1.650 | 21.5 | −2.30 |
| 11 | | 0.709 (ASP) | 0.010 | Cemented | 1.514 | 38.8 | |
| 12 | Lens 6 | 0.592 (ASP) | 2.247 | Plastic | 1.544 | 55.9 | 1.19 |
| 13 | | −2.461 (ASP) | 0.800 | | | | |
| 14 | IR-cut filter | Plano | 0.300 | Glass | 1.517 | 64.2 | — |
| 15 | | Plano | 0.200 | | | | |
| 16 | Cover-glass | Plano | 0.400 | Glass | 1.517 | 64.2 | |
| 17 | | Plano | 0.457 | | | | |
| 18 | Image | Plano | — | | | | |

Note:
Reference wavelength is 587.6 nm (d-line).

TABLE 10

Aspheric Coefficients

| Surface # | 3 | 4 | 5 | 6 | 7 |
|---|---|---|---|---|---|
| k = | 1.1803E+01 | 2.1732E−01 | −1.5535E+01 | 9.0000E+01 | 7.0051E−01 |
| A4 = | 2.3802E−03 | −6.5399E−02 | −2.5079E−01 | −5.8486E−02 | 2.0236E−02 |
| A6 = | 1.6617E−03 | 5.7339E−03 | 1.5608E−01 | 4.3632E−02 | −3.1239E−02 |
| A8 = | −2.0167E−04 | −7.3204E−03 | −4.8266E−02 | −2.0412E−02 | 6.7073E−03 |
| A10 = | 1.2094E−05 | 2.0883E−03 | 3.7221E−03 | 1.9071E−03 | −2.2735E−03 |

| Surface # | 8 | 10 | 11 | 12 | 13 |
|---|---|---|---|---|---|
| k = | −8.4256E+00 | −8.7038E−01 | −7.8615E−01 | −3.5314E+00 | −1.1968E+01 |
| A4 = | −3.6017E−02 | −5.0231E−02 | −2.3087E−01 | 4.6334E−01 | −5.4384E−02 |
| A6 = | 3.5178E−02 | 5.2399E−02 | 4.1827E−01 | −3.4821E−02 | 4.9935E−02 |
| A8 = | −3.9444E−02 | −7.1202E−02 | −6.4824E−01 | −7.4039E−01 | −2.5874E−02 |
| A10 = | 1.5841E−02 | 5.1794E−02 | 4.8141E−01 | 8.4436E−01 | 7.1057E−03 |
| A12 = | — | −1.5447E−02 | −1.3515E−01 | −2.7438E−01 | −9.9491E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.08 | (R11 − R12)/(R11 + R12) | −1.63 |
| Fno | 1.90 | (R9 + R12)/(R9 − R12) | −0.09 |
| HFOV [deg.] | 94.5 | T12/f | 1.77 |
| \|1/tan(HFOV)\| | 0.08 | TL/f | 11.58 |
| T23/CT2 | 1.77 | f1/f3 | 1.28 |
| CT6/CT5 | 2.36 | Σ\|f/fi\| | 2.47 |
| \|R11/EPD\| | 1.04 | Td/ImgH | 5.73 |

-continued

| 5th Embodiment | | | |
|---|---|---|---|
| \|R7/R8\| | 0.79 | \|Y62/Y11\| | 0.25 |
| (R5 + R6)/(R5 − R6) | −1.29 | — | — |

6th Embodiment

Figure 11:
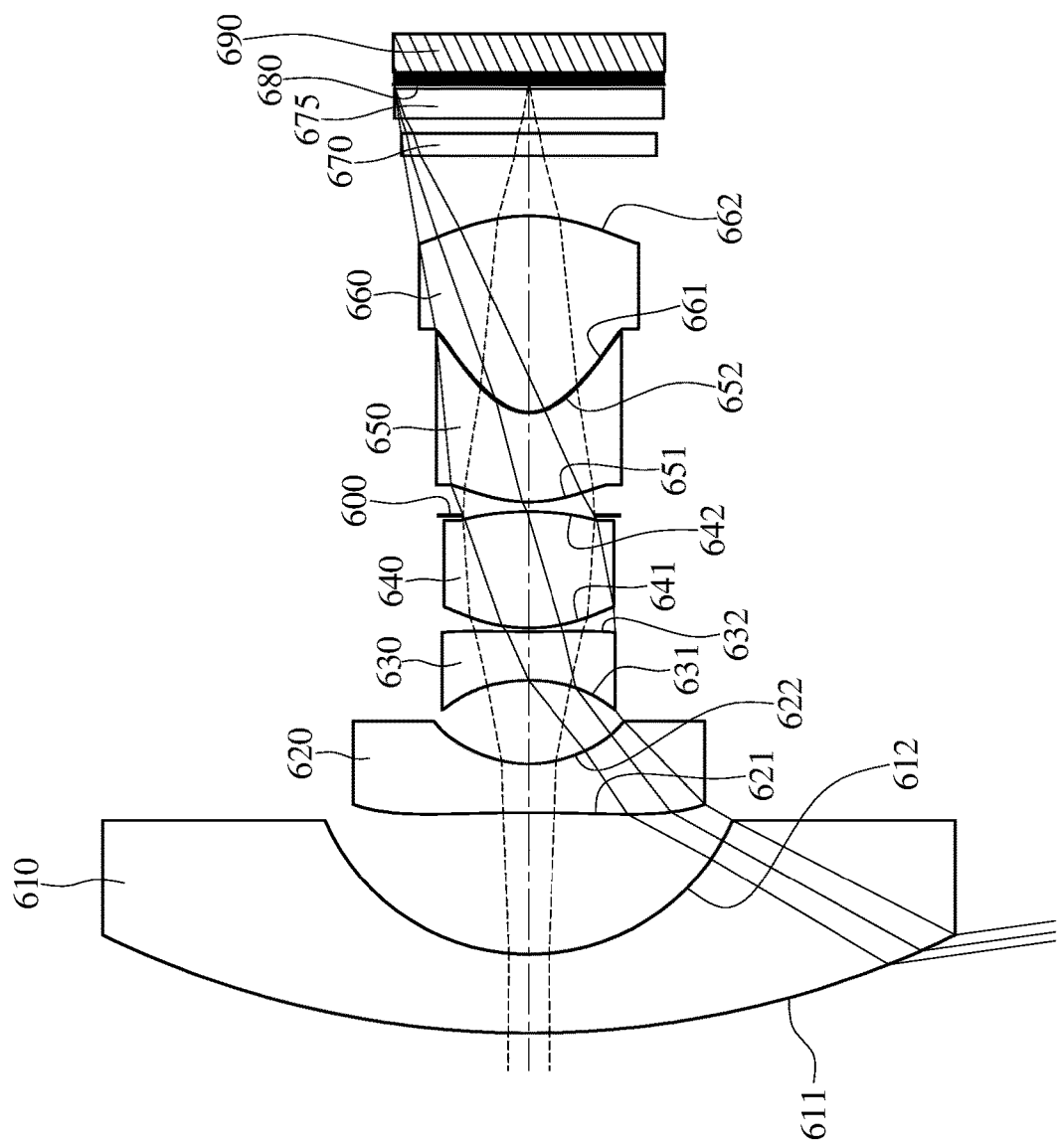
FIG. 11 is a schematic view of an image capturing unit according to the 6th embodiment of the present disclosure.
Figure 12:
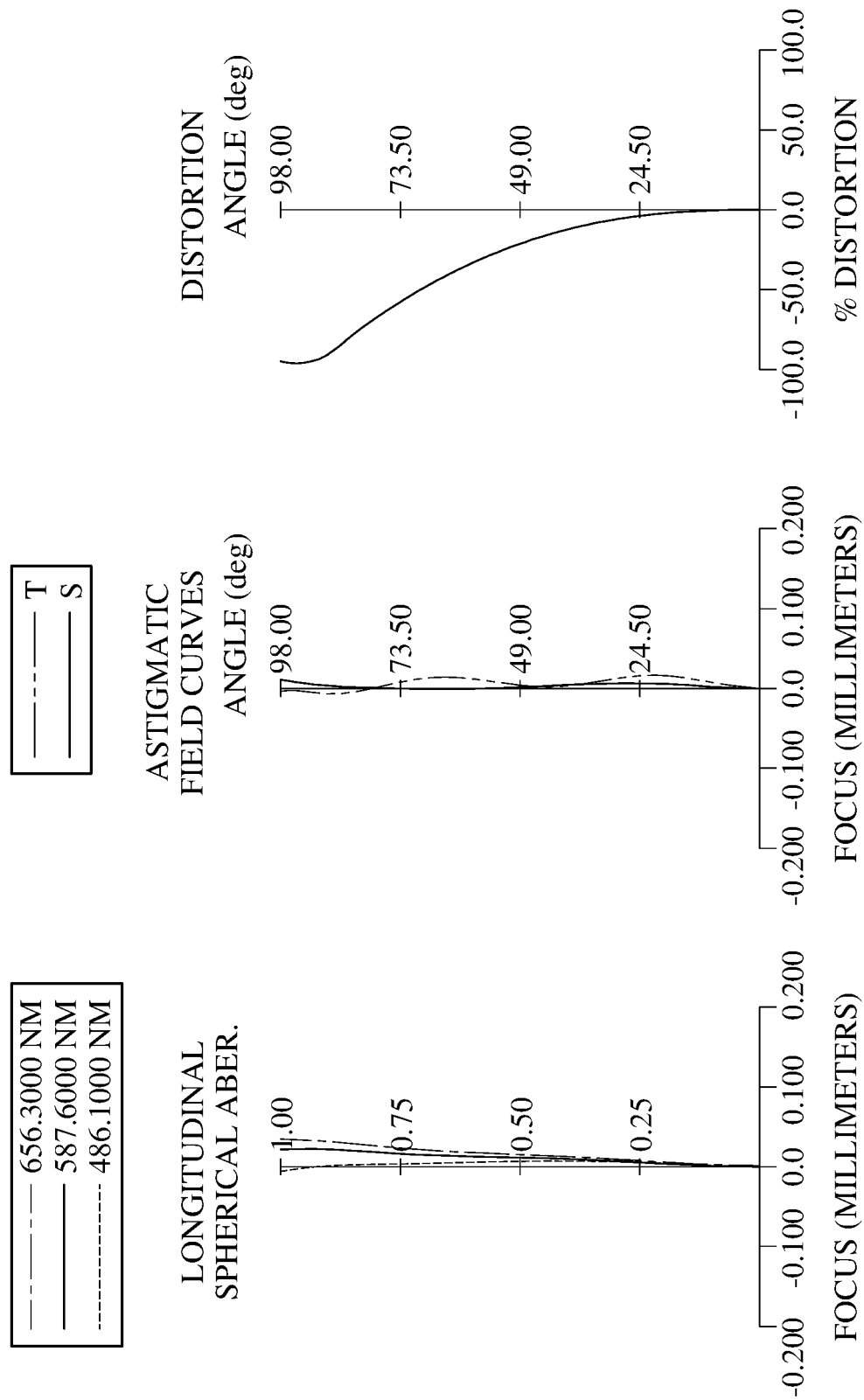
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens assembly (its reference numeral is omitted) of the present disclosure and an image sensor 690. The imaging optical lens assembly includes, in order from an object side to an image side, a first lens element 610, a second lens element 620, a third lens element 630, a fourth lens element 640, an aperture stop 600, a fifth lens element 650, a sixth lens element 660, an IR-cut filter 670, a cover-glass 675 and an image surface 680, wherein the imaging optical lens assembly has a total of six lens elements (610-660), and the fifth lens element 650 and the sixth lens element 660 are cemented together.

The first lens element 610 with negative refractive power has an object-side surface 611 being convex in a paraxial region thereof and an image-side surface 612 being concave in a paraxial region thereof. The first lens element 610 is made of glass material and has the object-side surface 611 and the image-side surface 612 being both spherical.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has at least one inflection point.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has at least one inflection point.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric.

In this embodiment, the image-side surface 652 of the fifth lens element 650 and the object-side surface 661 of the sixth lens element 660 are cemented together.

The IR-cut filter 670 and the cover-glass 675 both are made of glass material and located between the sixth lens element 660 and the image surface 680, and will not affect the focal length of the imaging optical lens assembly. The image sensor 690 is disposed on or near the image surface 680 of the imaging optical lens assembly.

The detailed optical data of the 6th embodiment are shown in Table 11 and the aspheric surface data are shown in Table 12 below.

TABLE 11

6th Embodiment
f = 1.05 mm, Fno = 1.90, HFOV = 98.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 13.030 | 1.050 | Glass | 1.589 | 61.3 | -6.76 |
| 2 | | 2.958 | 1.897 | | | | |
| 3 | Lens 2 | -24.503 (ASP) | 0.650 | Plastic | 1.583 | 30.2 | -2.52 |
| 4 | | 1.579 (ASP) | 1.117 | | | | |
| 5 | Lens 3 | -2.412 (ASP) | 0.650 | Plastic | 1.544 | 55.9 | -3.81 |
| 6 | | 15.922 (ASP) | 0.050 | | | | |
| 7 | Lens 4 | 2.302 (ASP) | 1.557 | Plastic | 1.583 | 30.2 | 2.76 |
| 8 | | -4.023 (ASP) | -0.050 | | | | |
| 9 | Ape. Stop | Plano | 0.179 | | | | |
| 10 | Lens 5 | 1.866 (ASP) | 1.190 | Plastic | 1.650 | 21.5 | -2.25 |
| 11 | | 0.614 (ASP) | 0.010 | Cemented | 1.514 | 38.8 | |
| 12 | Lens 6 | 0.546 (ASP) | 2.625 | Plastic | 1.544 | 55.9 | 1.22 |
| 13 | | -2.144 (ASP) | 0.800 | | | | |
| 14 | IR-cut filter | Plano | 0.300 | Glass | 1.517 | 64.2 | — |
| 15 | | Plano | 0.200 | | | | |
| 16 | cover-glass | Plano | 0.400 | Glass | 1.517 | 64.2 | |
| 17 | | Plano | 0.052 | | | | |
| 18 | Image | Plano | — | | | | |

Note:
Reference wavelength is 587.6 nm (d-line).

TABLE 12

Aspheric Coefficients

| Surface # | 3 | 4 | 5 | 6 | 7 |
|---|---|---|---|---|---|
| k = | -3.0933E+01 | 2.5092E-01 | -1.3789E+01 | 9.0000E+01 | 4.1250E-01 |
| A4 = | 1.9475E-03 | -6.8570E-02 | -2.5907E-01 | -5.3424E-02 | 3.3529E-02 |

TABLE 12-continued

| Aspheric Coefficients | | | | | |
|---|---|---|---|---|---|
| A6 = | 1.8765E−03 | 2.0533E−02 | 2.1159E−01 | 3.7366E−02 | −6.8507E−02 |
| A8 = | −2.7393E−04 | −9.8787E−03 | −1.1287E−01 | −1.9961E−02 | 4.1903E−02 |
| A10 = | 1.8938E−05 | 2.1551E−03 | 2.4429E−02 | 2.2438E−03 | −1.4174E−02 |

| Surface # | 8 | 10 | 11 | 12 | 13 |
|---|---|---|---|---|---|
| k = | −6.9300E+00 | −1.4417E+00 | −8.3707E−01 | −2.2588E+00 | −1.1968E+01 |
| A4 = | −2.1610E−02 | −3.1429E−02 | 8.1520E−04 | 8.4273E−01 | −6.7817E−02 |
| A6 = | −2.0073E−02 | −1.7345E−02 | −2.9783E−01 | −1.6007E+00 | 4.1441E−02 |
| A8 = | 2.5158E−02 | 5.7039E−03 | 2.4218E−01 | 1.6281E+00 | −9.4717E−03 |
| A10 = | −1.1778E−02 | 5.9151E−03 | −1.1050E−01 | −7.7983E−01 | −2.4839E−03 |
| A12 = | — | −5.5757E−03 | 1.2878E−02 | 1.3456E−01 | 1.3847E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.05 | (R11 − R12)/(R11 + R12) | −1.68 |
| Fno | 1.90 | (R9 + R12)/(R9 − R12) | −0.07 |
| HFOV [deg.] | 98.0 | T12/f | 1.81 |
| \|1/tan(HFOV)\| | 0.14 | TL/f | 12.13 |
| T23/CT2 | 1.72 | f1/f3 | 1.78 |
| CT6/CT5 | 2.21 | Σ\|f/fi\| | 2.55 |
| \|R11/EPD\| | 0.99 | Td/ImgH | 6.05 |
| \|R7/R8\| | 0.57 | \|Y62/Y11\| | 0.26 |
| (R5 + R6)/(R5 − R6) | −0.74 | — | — |

7th Embodiment

Figure 13:
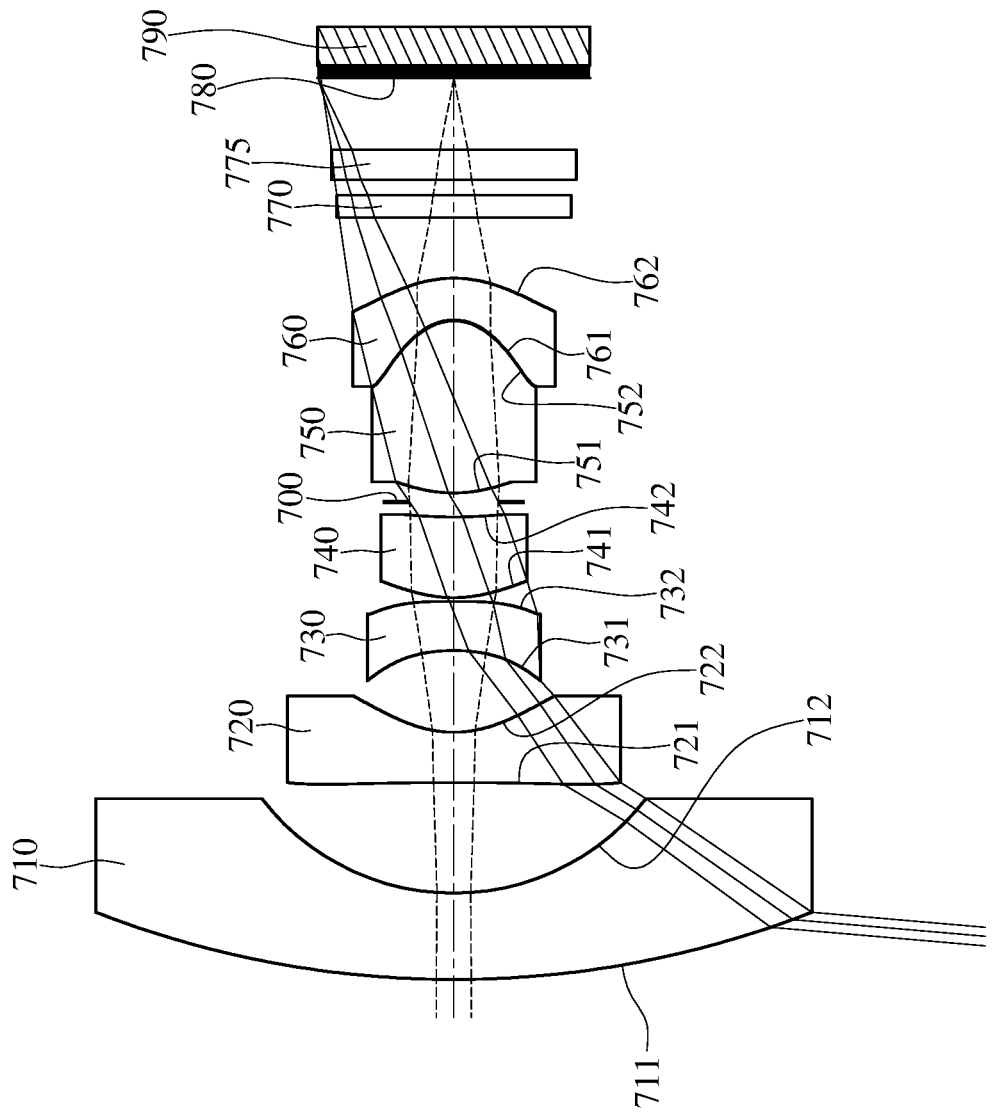
FIG. 13 is a schematic view of an image capturing unit according to the 7th embodiment of the present disclosure.
Figure 14:
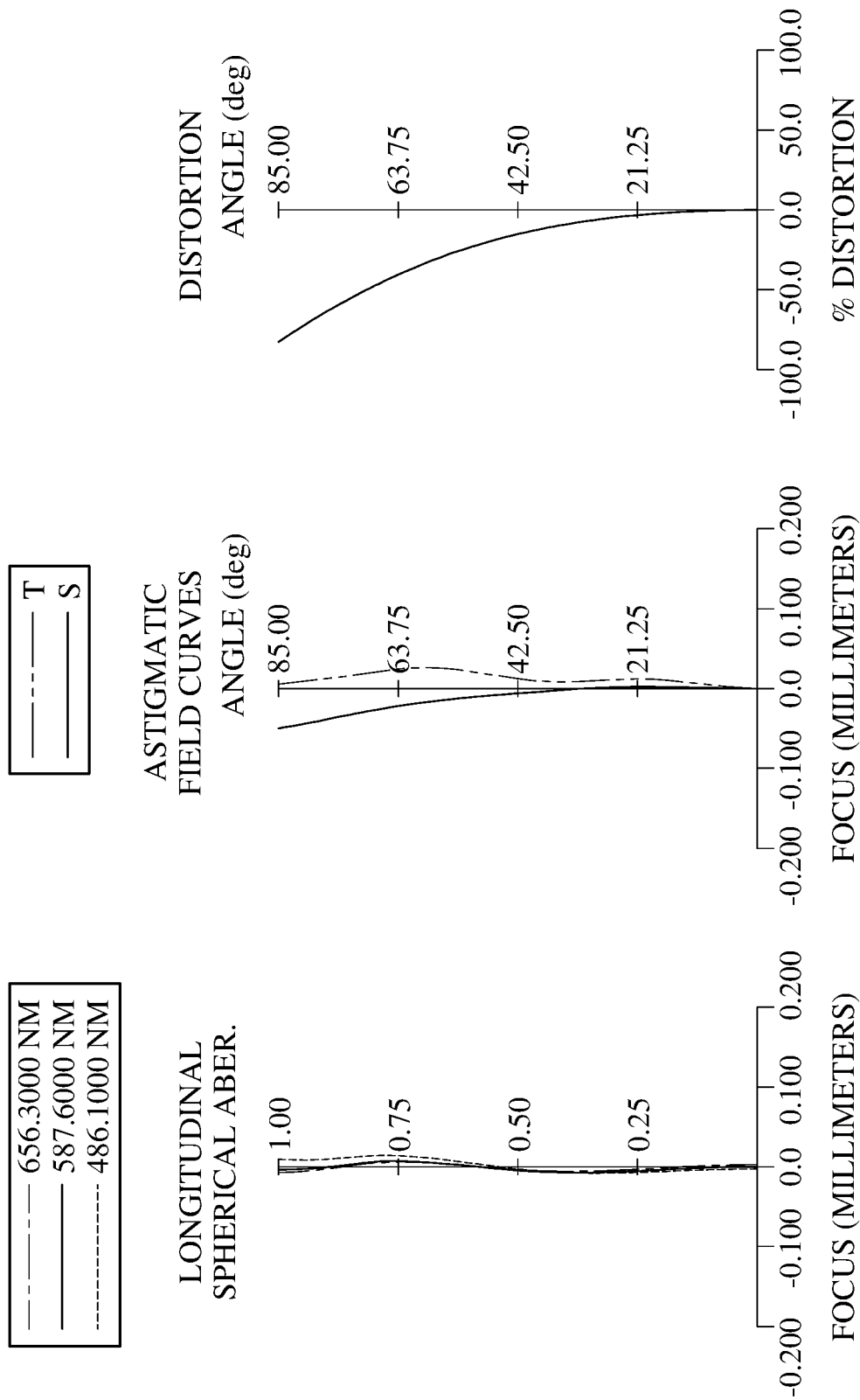
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens assembly (its reference numeral is omitted) of the present disclosure and an image sensor 790. The imaging optical lens assembly includes, in order from an object side to an image side, a first lens element 710, a second lens element 720, a third lens element 730, a fourth lens element 740, an aperture stop 700, a fifth lens element 750, a sixth lens element 760, an IR-cut filter 770, a cover-glass 775 and an image surface 780, wherein the imaging optical lens assembly has a total of six lens elements (710-760), and the fifth lens element 750 and the sixth lens element 760 are cemented together.

The first lens element 710 with negative refractive power has an object-side surface 711 being convex in a paraxial region thereof and an image-side surface 712 being concave in a paraxial region thereof. The first lens element 710 is made of glass material and has the object-side surface 711 and the image-side surface 712 being both spherical.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has at least one inflection point.

The third lens element 730 with negative refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with negative refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric.

In this embodiment, the image-side surface 752 of the fifth lens element 750 and the object-side surface 761 of the sixth lens element 760 are cemented together.

The IR-cut filter 770 and the cover-glass 775 both are made of glass material and located between the sixth lens element 760 and the image surface 780, and will not affect the focal length of the imaging optical lens assembly. The image sensor 790 is disposed on or near the image surface 780 of the imaging optical lens assembly.

The detailed optical data of the 7th embodiment are shown in Table 13 and the aspheric surface data are shown in Table 14 below.

TABLE 13

7th Embodiment
f = 1.20 mm, Fno = 2.60, HFOV = 85.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 13.030 | 1.142 | Glass | 1.589 | 61.3 | −7.53 |
| 2 | | 3.203 | 1.464 | | | | |
| 3 | Lens 2 | −48.293 (ASP) | 0.665 | Plastic | 1.535 | 55.8 | −2.68 |
| 4 | | 1.482 (ASP) | 1.081 | | | | |
| 5 | Lens 3 | −2.370 (ASP) | 0.650 | Plastic | 1.535 | 55.8 | −5.12 |
| 6 | | −19.240 (ASP) | 0.050 | | | | |
| 7 | Lens 4 | 1.735 (ASP) | 1.067 | Plastic | 1.583 | 30.2 | 3.86 |
| 8 | | 5.859 (ASP) | 0.198 | | | | |
| 9 | Ape. Stop | Plano | 0.120 | | | | |
| 10 | Lens 5 | 1.786 (ASP) | 2.278 | Plastic | 1.535 | 55.8 | 1.30 |
| 11 | | −0.635 (ASP) | 0.010 | Cemented | 1.514 | 38.8 | |
| 12 | Lens 6 | −0.657 (ASP) | 0.554 | Plastic | 1.639 | 23.5 | −2.20 |
| 13 | | −1.635 (ASP) | 0.800 | | | | |
| 14 | IR-cut filter | Plano | 0.300 | Glass | 1.517 | 64.2 | — |
| 15 | | Plano | 0.200 | | | | |
| 16 | cover-glass | Plano | 0.400 | Glass | 1.517 | 64.2 | |
| 17 | | Plano | 0.947 | | | | |
| 18 | Image | Plano | — | | | | |

Note:
Reference wavelength is 587.6 nm (d-line).

TABLE 14

Aspheric Coefficients

| Surface # | 3 | 4 | 5 | 6 | 7 |
|---|---|---|---|---|---|
| k = | 9.0000E+01 | −2.4294E−01 | −1.4078E+01 | 9.0000E+01 | −1.8852E+00 |
| A4 = | −1.5619E−03 | −5.7832E−02 | −2.0040E−01 | −1.4099E−01 | −4.5312E−02 |
| A6 = | 7.9290E−04 | −1.2954E−02 | 5.7923E−02 | 4.3205E−02 | 9.3130E−03 |

| Surface # | 8 | 10 | 11 | 12 | 13 |
|---|---|---|---|---|---|
| k = | −9.1468E+00 | −9.2084E+00 | −1.0632E+00 | −9.1394E−01 | −1.0221E+00 |
| A4 = | −1.3549E−02 | 1.4538E−01 | −3.4661E−01 | −5.0672E−01 | −1.5244E−02 |
| A6 = | −7.7731E−03 | −3.9641E−01 | 1.2188E+00 | 1.5784E+00 | 9.1928E−02 |
| A8 = | — | 8.4939E−01 | −2.2544E+00 | −2.3823E+00 | −8.3744E−02 |
| A10 = | — | −8.0958E−01 | 1.7448E+00 | 1.6796E+00 | 3.7402E−02 |
| A12 = | — | 9.5934E−02 | −4.1609E−01 | −3.8207E−01 | −6.1638E−03 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.20 | (R11 − R12)/(R11 + R12) | −0.43 |
| Fno | 2.60 | (R9 + R12)/(R9 − R12) | 0.04 |
| HFOV [deg.] | 85.0 | T12/f | 1.22 |
| |1/tan(HFOV)| | 0.09 | TL/f | 9.94 |
| T23/CT2 | 1.63 | f1/f3 | 1.47 |
| CT6/CT5 | 0.24 | Σ|f/fi| | 2.62 |
| |R11/EPD| | 1.42 | Td/ImgH | 5.16 |
| |R7/R8| | 0.30 | |Y62/Y11| | 0.28 |
| (R5 + R6)/(R5 − R6) | −1.28 | — | — |

8th Embodiment

Figure 15:
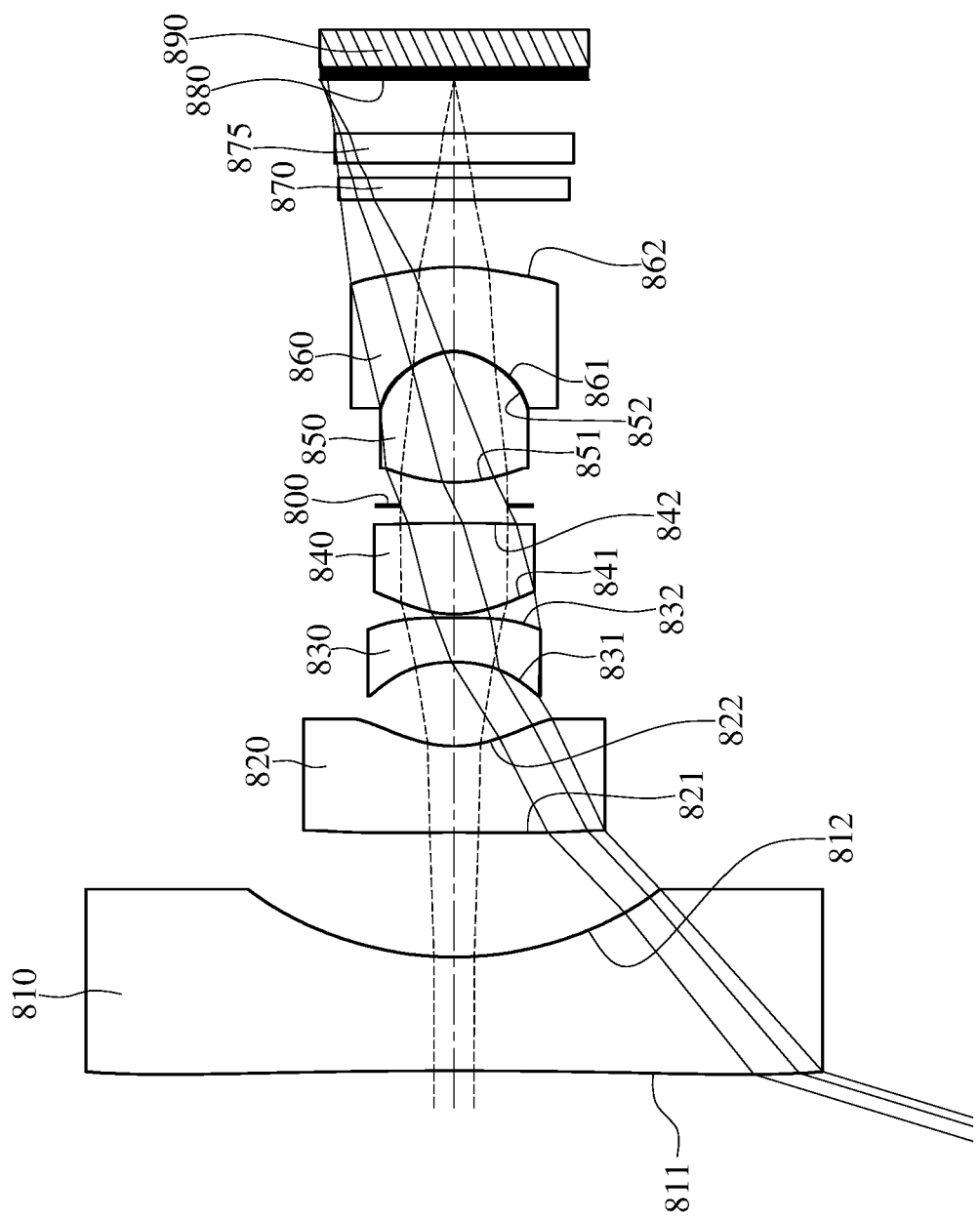
FIG. 15 is a schematic view of an image capturing unit according to the 8th embodiment of the present disclosure.
Figure 16:
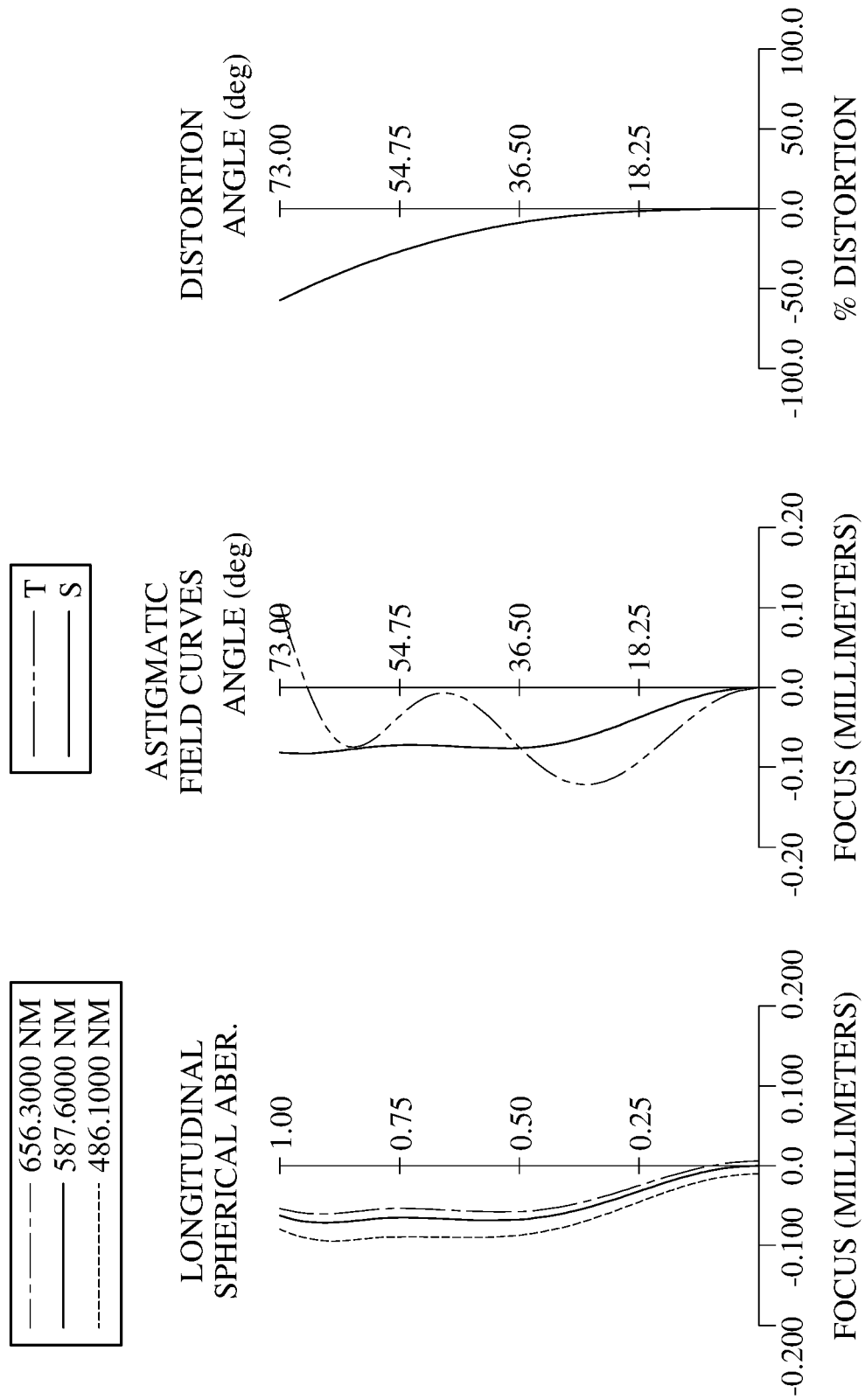
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging optical lens assembly (its reference numeral is omitted) of the present disclosure and an image sensor 890. The imaging optical lens assembly includes, in order from an object side to an image side, a first lens element 810, a second lens element 820, a third lens element 830, a fourth lens element 840, an aperture stop 800, a fifth lens element 850, a sixth lens element 860, an IR-cut filter 870, a cover-glass 875 and an image surface 880, wherein the imaging optical lens assembly has a total of six lens elements (810-860), and the fifth lens element 850 and the sixth lens element 860 are cemented together.

The first lens element 810 with negative refractive power has an object-side surface 811 being concave in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric. Each of the object-side surface 821 and the image-side surface 822 of the second lens element 820 has at least one inflection point.

The third lens element 830 with negative refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with negative refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric.

In this embodiment, the image-side surface 852 of the fifth lens element 850 and the object-side surface 861 of the sixth lens element 860 are cemented together.

The IR-cut filter 870 and the cover-glass 875 both are made of glass material and located between the sixth lens element 860 and the image surface 880, and will not affect the focal length of the imaging optical lens assembly. The image sensor 890 is disposed on or near the image surface 880 of the imaging optical lens assembly.

The detailed optical data of the 8th embodiment are shown in Table 15 and the aspheric surface data are shown in Table 16 below.

TABLE 15

8th Embodiment
f = 1.40 mm, Fno = 2.60, HFOV = 73.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −100.000 (ASP) | 1.541 | Plastic | 1.544 | 55.9 | −7.92 |
| 2 | | 4.524 (ASP) | 1.689 | | | | |
| 3 | Lens 2 | −63.636 (ASP) | 1.171 | Plastic | 1.544 | 55.9 | −2.86 |
| 4 | | 1.602 (ASP) | 1.140 | | | | |
| 5 | Lens 3 | −1.976 (ASP) | 0.599 | Plastic | 1.535 | 55.8 | −3.74 |
| 6 | | −166.721 (ASP) | 0.050 | | | | |
| 7 | Lens 4 | 1.443 (ASP) | 1.233 | Plastic | 1.583 | 30.2 | 2.46 |
| 8 | | −200.000 (ASP) | 0.238 | | | | |
| 9 | Ape. Stop | Plano | 0.317 | | | | |
| 10 | Lens 5 | 1.968 (ASP) | 1.768 | Plastic | 1.535 | 55.8 | 1.16 |
| 11 | | −0.622 (ASP) | 0.010 | Cemented | 1.514 | 38.8 | |
| 12 | Lens 6 | −0.689 (ASP) | 1.140 | Plastic | 1.639 | 23.5 | −1.82 |
| 13 | | −2.783 (ASP) | 0.909 | | | | |
| 14 | IR-cut filter | Plano | 0.300 | Glass | 1.517 | 64.2 | — |
| 15 | | Plano | 0.200 | | | | |
| 16 | cover-glass | Plano | 0.400 | Glass | 1.517 | 64.2 | |
| 17 | | Plano | 0.731 | | | | |
| 18 | Image | Plano | — | | | | |

Note:
Reference wavelength is 587.6 nm (d-line).

TABLE 16

Aspheric Coefficients

| Surface # | 1 | 2 | 3 | 4 | 5 | 6 |
|---|---|---|---|---|---|---|
| k = | −2.3563E+01 | −1.8341E+00 | 8.0820E+01 | −3.0320E−01 | −7.9112E+00 | 8.8125E+01 |
| A4 = | −4.4389E−07 | 2.5198E−04 | 4.9465E−03 | −9.9467E−02 | −1.7961E−01 | −1.3223E−01 |
| A6 = | 7.7748E−06 | 2.2453E−04 | −9.4229E−05 | 5.7424E−02 | −4.3740E−02 | 3.2323E−02 |
| A8 = | −2.5278E−08 | — | 2.4467E−04 | −4.8915E−02 | 9.5966E−02 | 5.7061E−03 |
| A10 = | — | — | −7.3732E−05 | 1.1525E−02 | −2.6717E−02 | −2.3354E−03 |

| Surface # | 7 | 8 | 10 | 11 | 12 | 13 |
|---|---|---|---|---|---|---|
| k = | −2.2743E+00 | −3.4741E+01 | −1.0470E+01 | −1.2262E+00 | −7.7229E−01 | −1.2678E+00 |
| A4 = | −5.4753E−02 | −4.2199E−02 | 1.1735E−01 | 1.1634E+00 | 5.5067E−01 | 4.9056E−02 |

TABLE 16-continued

| Aspheric Coefficients | | | | | | |
|---|---|---|---|---|---|---|
| A6 = | 5.4856E−02 | 4.4315E−02 | −3.0787E−01 | −3.3758E+00 | −9.2014E−01 | 1.8194E−02 |
| A8 = | −5.4114E−02 | −7.5117E−02 | 5.6642E−01 | 4.2768E+00 | 1.6080E+00 | −1.9358E−02 |
| A10 = | 2.0294E−02 | 5.4885E−02 | −5.2683E−01 | −2.5238E+00 | −1.5256E+00 | 4.7792E−04 |
| A12 = | — | — | 1.9351E−01 | 3.8156E−01 | 3.5373E−01 | 9.7202E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.40 | (R11 − R12)/(R11 + R12) | −0.60 |
| Fno | 2.60 | (R9 + R12)/(R9 − R12) | −0.17 |
| HFOV [deg.] | 73.0 | T12/f | 1.21 |
| \|1/tan(HFOV)\| | 0.31 | TL/f | 9.62 |
| T23/CT2 | 0.97 | f1/f3 | 2.12 |
| CT6/CT5 | 0.64 | Σ\|f/fi\| | 3.58 |
| \|R11/EPD\| | 1.28 | Td/ImgH | 6.03 |
| \|R7/R8\| | 0.01 | \|Y62/Y11\| | 0.28 |
| (R5 + R6)/(R5 − R6) | −1.02 | — | — |

9th Embodiment

Figure 17:
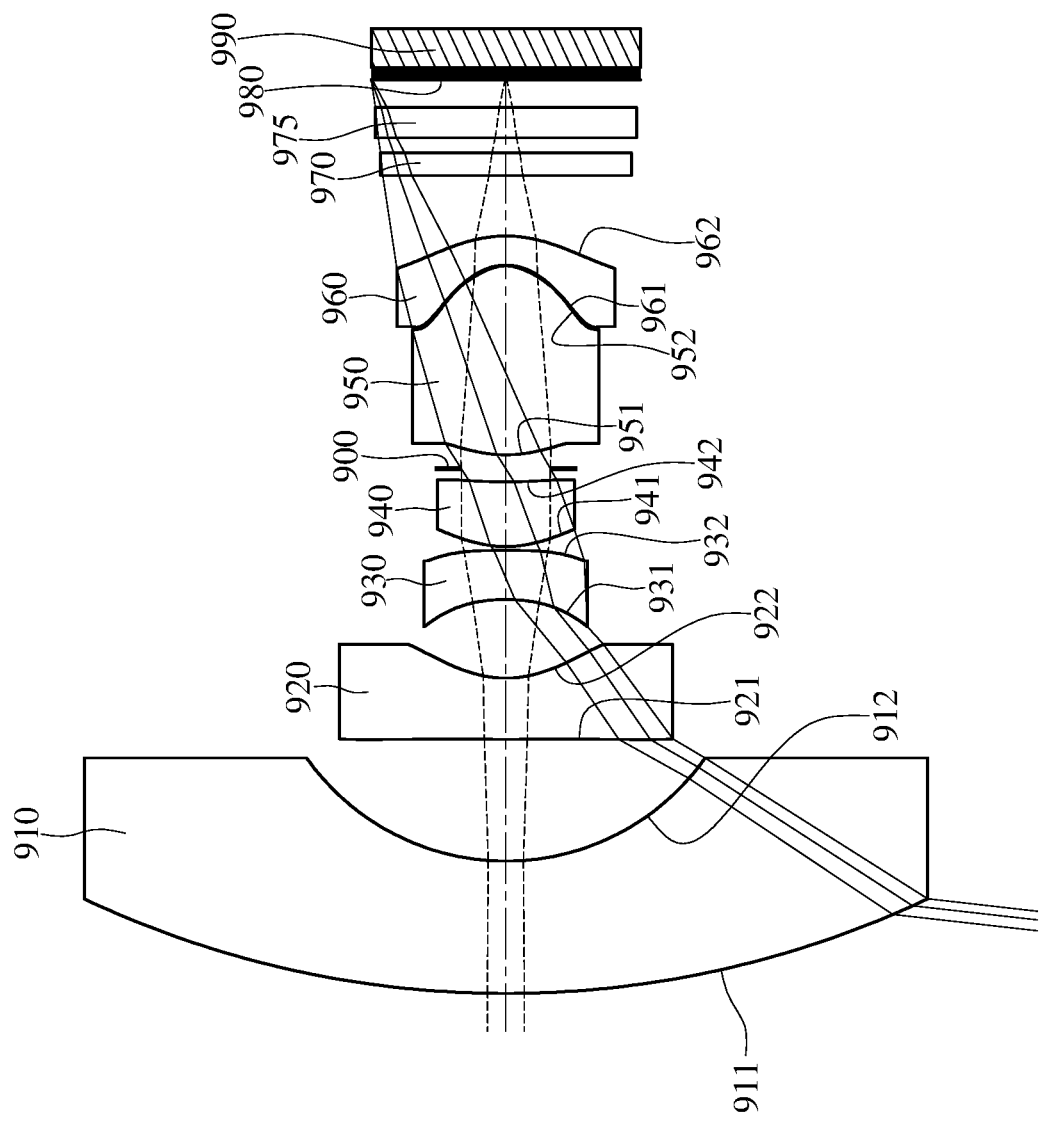
FIG. 17 is a schematic view of an image capturing unit according to the 9th embodiment of the present disclosure.
Figure 18:
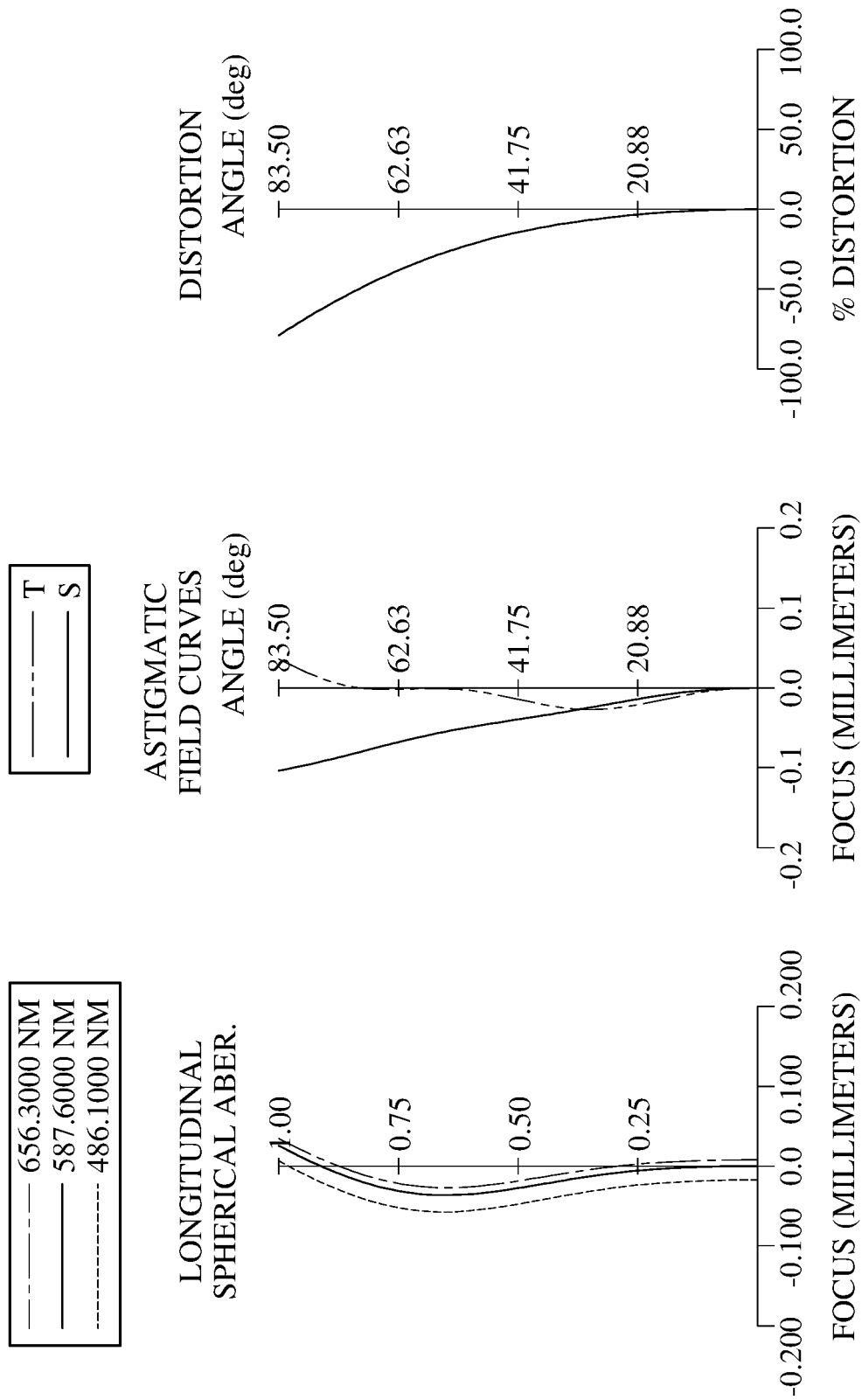
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging optical lens assembly (its reference numeral is omitted) of the present disclosure and an image sensor 990. The imaging optical lens assembly includes, in order from an object side to an image side, a first lens element 910, a second lens element 920, a third lens element 930, a fourth lens element 940, an aperture stop 900, a fifth lens element 950, a sixth lens element 960, an IR-cut filter 970, a cover-glass 975 and an image surface 980, wherein the imaging optical lens assembly has a total of six lens elements (910-960), and the fifth lens element 950 and the sixth lens element 960 are cemented together.

The first lens element 910 with negative refractive power has an object-side surface 911 being convex in a paraxial region thereof and an image-side surface 912 being concave in a paraxial region thereof. The first lens element 910 is made of glass material and has the object-side surface 911 and the image-side surface 912 being both spherical.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. Each of the object-side surface 921 and the image-side surface 922 of the second lens element 920 has at least one inflection point.

The third lens element 930 with negative refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric.

The fifth lens element 950 with positive refractive power has an object-side surface 951 being convex in a paraxial region thereof and an image-side surface 952 being convex in a paraxial region thereof. The fifth lens element 950 is made of plastic material and has the object-side surface 951 and the image-side surface 952 being both aspheric.

The sixth lens element 960 with negative refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric.

In this embodiment, the image-side surface 952 of the fifth lens element 950 and the object-side surface 961 of the sixth lens element 960 are cemented together.

The IR-cut filter 970 and the cover-glass 975 both are made of glass material and located between the sixth lens element 960 and the image surface 980, and will not affect the focal length of the imaging optical lens assembly. The image sensor 990 is disposed on or near the image surface 980 of the imaging optical lens assembly.

The detailed optical data of the 9th embodiment are shown in Table 17 and the aspheric surface data are shown in Table 18 below.

TABLE 17

9th Embodiment
f = 1.20 mm, Fno = 2.45, HFOV = 83.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 13.030 | 1.751 | Glass | 1.589 | 61.3 | −7.79 |

TABLE 17-continued

9th Embodiment
f = 1.20 mm, Fno = 2.45, HFOV = 83.5 deg.

| Surface # | | Curvature Radius | Thickness | Material | Index | Abbe # | Focal Length |
|---|---|---|---|---|---|---|---|
| 2 | | 3.224 | 1.612 | | | | |
| 3 | Lens 2 | 99.635 (ASP) | 0.809 | Plastic | 1.535 | 55.8 | −2.77 |
| 4 | | 1.455 (ASP) | 1.040 | | | | |
| 5 | Lens 3 | −2.248 (ASP) | 0.650 | Plastic | 1.535 | 55.8 | −4.83 |
| 6 | | −18.941 (ASP) | 0.050 | | | | |
| 7 | Lens 4 | 1.494 (ASP) | 0.856 | Plastic | 1.583 | 30.2 | 3.15 |
| 8 | | 6.285 (ASP) | 0.174 | | | | |
| 9 | Ape. Stop | Plano | 0.184 | | | | |
| 10 | Lens 5 | 1.710 (ASP) | 2.500 | Plastic | 1.535 | 55.8 | 1.19 |
| 11 | | −0.500 (ASP) | 0.010 | Cemented | 1.514 | 38.8 | |
| 12 | Lens 6 | −0.653 (ASP) | 0.385 | Plastic | 1.639 | 23.5 | −1.94 |
| 13 | | −1.696 (ASP) | 0.800 | | | | |
| 14 | IR-cut filter | Plano | 0.300 | Glass | 1.517 | 64.2 | — |
| 15 | | Plano | 0.200 | | | | |
| 16 | cover-glass | Plano | 0.400 | Glass | 1.517 | 64.2 | |
| 17 | | Plano | 0.365 | | | | |
| 18 | Image | Plano | — | | | | |

Note:
Reference wavelength is 587.6 nm (d-line).

TABLE 18

Aspheric Coefficients

| Surface # | 3 | 4 | 5 | 6 | 7 |
|---|---|---|---|---|---|
| k = | 9.0000E+01 | −2.3494E−01 | −1.3511E+01 | 9.0000E+01 | −1.7849E+00 |
| A4 = | −4.3520E−03 | −5.6594E−02 | −2.0669E−01 | −1.4099E−01 | −4.5312E−02 |
| A6 = | 7.2127E−04 | −2.0836E−02 | 6.0572E−02 | 4.3205E−02 | 9.3130E−03 |

| Surface # | 8 | 10 | 11 | 12 | 13 |
|---|---|---|---|---|---|
| k = | −7.5791E+01 | −1.0107E+01 | −1.1304E+00 | −7.9911E−01 | −1.0943E+00 |
| A4 = | −1.3549E−02 | 1.2617E−01 | 1.3725E+00 | 8.7410E−02 | −4.7753E−03 |
| A6 = | −7.7731E−03 | −9.7441E−02 | −3.2845E+00 | 1.8646E−01 | 9.5706E−02 |
| A8 = | — | −6.0318E−01 | 3.0409E+00 | −5.1197E−01 | −9.1165E−02 |
| A10 = | — | 1.7003E+00 | −1.0938E+00 | 5.7340E−01 | 4.2501E−02 |
| A12 = | — | −1.3833E+00 | 1.1807E−01 | −1.6813E−01 | −7.6365E−03 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.20 | (R11 − R12)/(R11 + R12) | −0.44 |
| Fno | 2.45 | (R9 + R12)/(R9 − R12) | 0.004 |
| HFOV [deg.] | 83.5 | T12/f | 1.34 |
| |1/tan(HFOV)| | 0.11 | TL/f | 10.08 |
| T23/CT2 | 1.29 | f1/f3 | 1.61 |
| CT6/CT5 | 0.15 | ΣIf/fil | 2.84 |
| |R11/EPD| | 1.33 | Td/ImgH | 5.64 |
| |R7/R8| | 0.24 | |Y62/Y11| | 0.26 |
| (R5 + R6)/(R5 − R6) | −1.27 | — | — |

10th Embodiment

Figure 19:
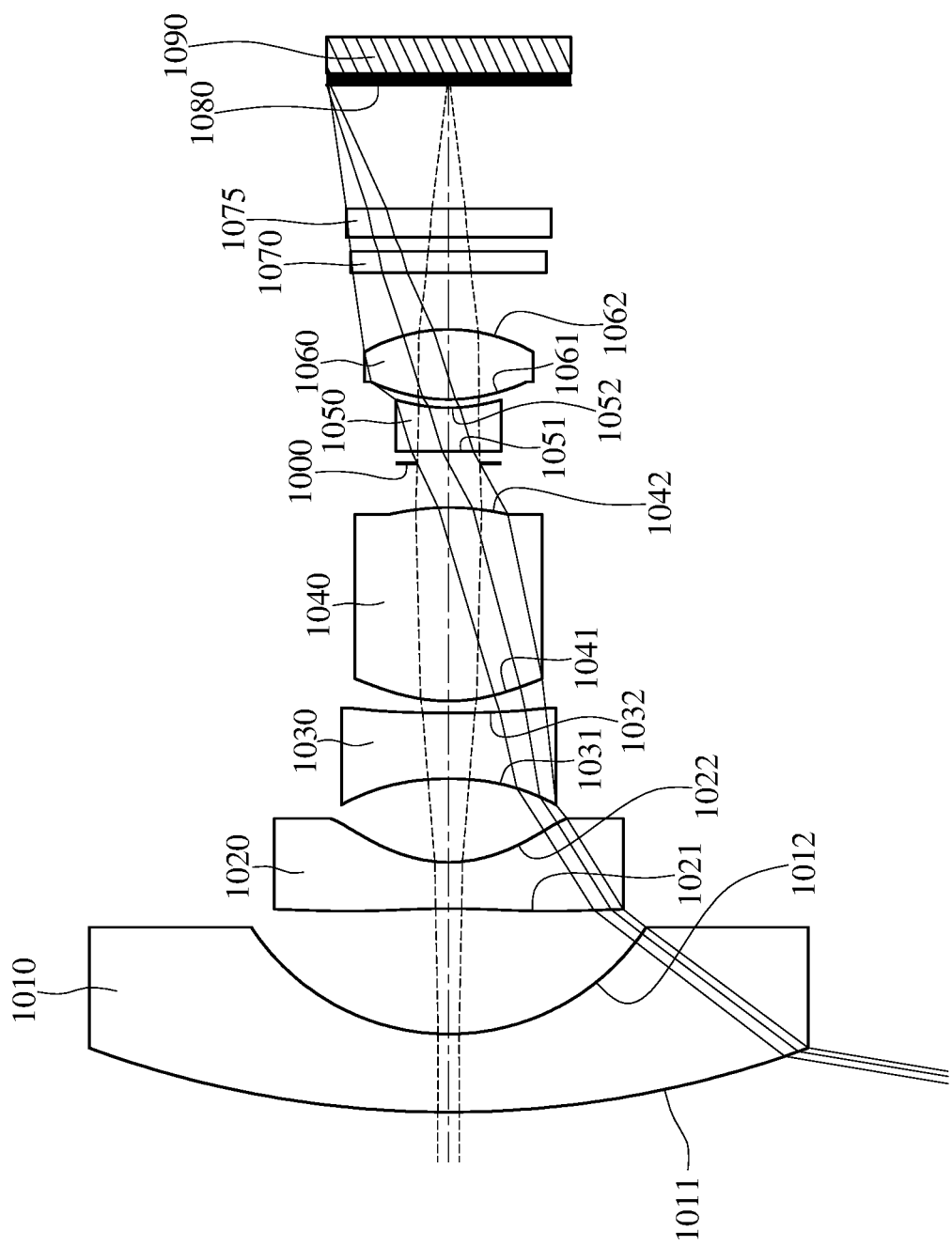
FIG. 19 is a schematic view of an image capturing unit according to the 10th embodiment of the present disclosure.
Figure 20:
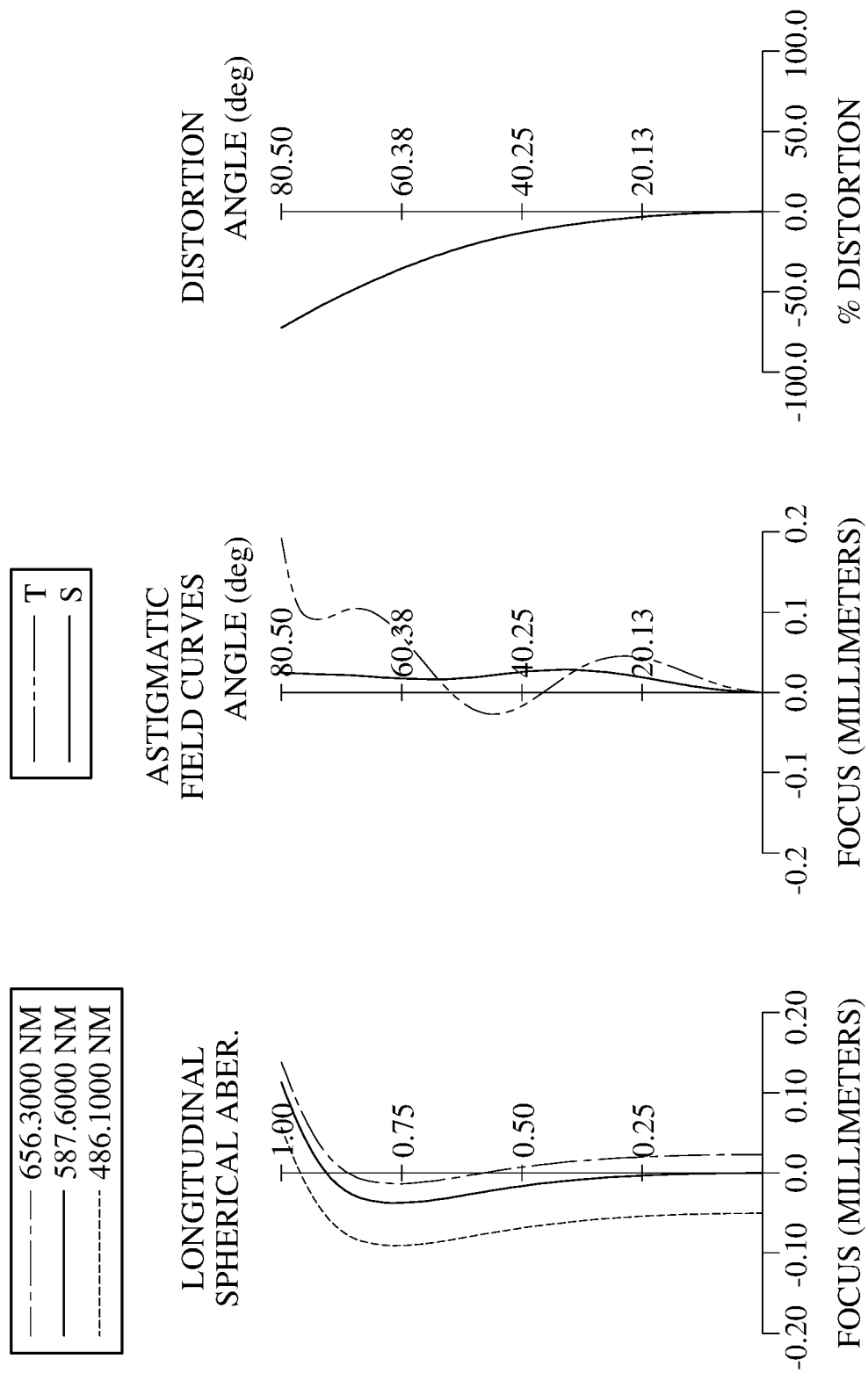
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging optical lens assembly (its reference numeral is omitted) of the present disclosure and an image sensor 1090. The imaging optical lens assembly includes, in order from an object side to an image side, a first lens element 1010, a second lens element 1020, a third lens element 1030, a fourth lens element 1040, an aperture stop 1000, a fifth lens element 1050, a sixth lens element 1060, an IR-cut filter 1070, a cover-glass 1075 and an image surface 1080, wherein the imaging optical lens assembly has a total of six lens elements (1010-1060), and the fifth lens element 1050 and the sixth lens element 1060 are cemented together.

The first lens element 1010 with negative refractive power has an object-side surface 1011 being convex in a paraxial region thereof and an image-side surface 1012 being concave in a paraxial region thereof. The first lens element 1010 is made of glass material and has the object-side surface 1011 and the image-side surface 1012 being both spherical.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric. Each of the object-side surface 1021 and the image-side surface 1022 of the second lens element 1020 has at least one inflection point.

The third lens element 1030 with negative refractive power has an object-side surface 1031 being concave in a paraxial region thereof and an image-side surface 1032 being concave in a paraxial region thereof. The third lens element 1030 is made of plastic material and has the object-side surface 1031 and the image-side surface 1032 being both aspheric. The image-side surface 1032 of the third lens element 1030 has at least one inflection point.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric.

The sixth lens element 1060 with positive refractive power has an object-side surface 1061 being convex in a paraxial region thereof and an image-side surface 1062 being convex in a paraxial region thereof. The sixth lens element 1060 is made of plastic material and has the object-side surface 1061 and the image-side surface 1062 being both aspheric.

The IR-cut filter 1070 and the cover-glass 1075 both are made of glass material and located between the sixth lens element 1060 and the image surface 1080, and will not affect the focal length of the imaging optical lens assembly. The image sensor 1090 is disposed on or near the image surface 1080 of the imaging optical lens assembly.

The detailed optical data of the 10th embodiment are shown in Table 19 and the aspheric surface data are shown in Table 20 below.

TABLE 19

10th Embodiment
f = 1.21 mm, Fno = 4.00, HFOV = 80.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 14.604 | 1.099 | Glass | 1.589 | 61.3 | −7.55 |
| 2 | | 3.313 | 1.767 | | | | |
| 3 | Lens 2 | −11.257 (ASP) | 0.652 | Plastic | 1.535 | 55.8 | −3.06 |
| 4 | | 1.956 (ASP) | 1.176 | | | | |
| 5 | Lens 3 | −3.914 (ASP) | 0.925 | Plastic | 1.544 | 55.9 | −5.61 |
| 6 | | 14.990 (ASP) | 0.169 | | | | |
| 7 | Lens 4 | 2.396 (ASP) | 2.724 | Plastic | 1.583 | 30.2 | 2.92 |
| 8 | | −3.434 (ASP) | 0.621 | | | | |
| 9 | Ape. Stop | Plano | 0.169 | | | | |
| 10 | Lens 5 | 42.621 (ASP) | 0.614 | Plastic | 1.639 | 23.5 | −3.69 |
| 11 | | 2.221 (ASP) | 0.118 | | | | |
| 12 | Lens 6 | 2.206 (ASP) | 0.985 | Plastic | 1.544 | 55.9 | 2.23 |
| 13 | | −2.280 (ASP) | 0.800 | | | | |
| 14 | IR-cut filter | Plano | 0.300 | Glass | 1.517 | 64.2 | — |
| 15 | | Plano | 0.200 | | | | |
| 16 | cover-glass | Plano | 0.400 | Glass | 1.517 | 64.2 | |
| 17 | | Plano | 1.740 | | | | |
| 18 | Image | Plano | — | | | | |

Note:
Reference wavelength is 587.6 nm (d-line).

TABLE 20

Aspheric Coefficients

| Surface # | 3 | 4 | 5 | 6 | 7 |
|---|---|---|---|---|---|
| k = | 1.3397E+01 | −6.4908E−02 | −7.4841E+00 | 6.6674E+01 | −3.7065E−01 |
| A4 = | 1.9494E−02 | −6.0209E−03 | −3.3127E−02 | −2.0859E−02 | −2.9930E−02 |
| A6 = | −2.7799E−03 | −1.8154E−02 | −5.8670E−03 | 2.7329E−02 | 2.2354E−02 |
| A8 = | 1.7865E−04 | 7.4434E−03 | 1.0112E−02 | −1.2337E−02 | −1.6517E−02 |
| A10 = | −1.5037E−07 | −1.7976E−03 | −2.5819E−03 | 1.6790E−03 | 3.6059E−03 |

| Surface # | 8 | 10 | 11 | 12 | 13 |
|---|---|---|---|---|---|
| k = | −1.0813E+01 | 2.4677E+01 | −3.5907E+00 | −3.8037E+00 | −3.3615E+00 |
| A4 = | −3.4241E−02 | 8.2229E−02 | 5.6582E−02 | −4.1573E−02 | −2.0479E−03 |

TABLE 20-continued

| Aspheric Coefficients | | | | | |
|---|---|---|---|---|---|
| A6 = | 7.4090E−02 | −4.6138E−01 | −4.5369E−01 | 9.4001E−02 | −2.1692E−01 |
| A8 = | −8.5258E−02 | 1.8898E+00 | 1.5178E+00 | −3.9338E−02 | 5.3506E−01 |
| A10 = | 2.7133E−02 | −6.4422E+00 | −3.0199E+00 | −3.5116E−02 | −4.8031E−01 |
| A12 = | — | — | 2.5066E+00 | 2.6288E−02 | 1.4361E−01 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| | 10th Embodiment | | |
|---|---|---|---|
| f [mm] | 1.21 | (R11 − R12)/(R11 + R12) | −60.29 |
| Fno | 4.00 | (R9 + R12)/(R9 − R12) | 0.90 |
| HFOV [deg.] | 80.5 | T12/f | 1.46 |
| $|1/\tan(HFOV)|$ | 0.17 | TL/f | 11.91 |
| T23/CT2 | 1.80 | f1/f3 | 1.34 |
| CT6/CT5 | 1.60 | $\Sigma|f/fi|$ | 2.06 |
| $|R11/EPD|$ | 7.27 | Td/ImgH | 6.42 |
| $|R7/R8|$ | 0.70 | $|Y62/Y11|$ | 0.23 |
| (R5 + R6)/(R5 − R6) | −0.59 | — | — |

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising six lens elements, the six lens elements being, in order from an object side to an image side, a first lens element, a second lens element, a third lens element, a fourth lens element, a fifth lens element and a sixth lens element;
wherein the first lens element has negative refractive power, the second lens element has negative refractive power, the third lens element has negative refractive power, the third lens element has an object-side surface being concave in a paraxial region thereof, and the imaging optical lens assembly has a total of six lens elements;
wherein a focal length of the imaging optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, a sum of absolute values of ratios f/fi is $\Sigma|f/fi|$, a curvature radius of the object-side surface of the third lens element is R5, a curvature radius of an image-side surface of the third lens element is R6, and the following conditions are satisfied:

$2.47<\Sigma|f/fi|<5.0$, wherein $i=1,2,3,4,5,6$; and $-4.0<(R5+R6)/(R5-R6)<0.65$.

2. The imaging optical lens assembly of claim 1, wherein the image-side surface of the third lens element is concave in a paraxial region thereof.

3. The imaging optical lens assembly of claim 1, wherein a curvature radius of an object-side surface of the sixth lens element is R11, an entrance pupil diameter of the imaging optical lens assembly is EPD, and the following condition is satisfied:

$|R11/EPD|<1.50$.

4. The imaging optical lens assembly of claim 1, wherein an axial distance between an object-side surface of the first lens element and an image-side surface of the sixth lens element is Td, a maximum image height of the imaging optical lens assembly is ImgH, and the following condition is satisfied:

$4.0<Td/ImgH\leq5.64$.

5. The imaging optical lens assembly of claim 1, wherein a maximum effective radius of an object-side surface of the first lens element is Y11, a maximum effective radius of an image-side surface of the sixth lens element is Y62, half of a maximal field of view of the imaging optical lens assembly is HFOV, and the following conditions are satisfied:

$|Y62/Y11|<0.48$; and $|1/\tan(HFOV)|<0.50$.

6. An imaging optical lens assembly comprising six lens elements, the six lens elements being, in order from an object side to an image side, a first lens element, a second lens element, a third lens element, a fourth lens element, a fifth lens element and a sixth lens element;
wherein the first lens element has negative refractive power, the second lens element has negative refractive power, the third lens element has negative refractive power, the third lens element has an object-side surface being concave in a paraxial region thereof, and the imaging optical lens assembly has a total of six lens elements;
wherein at least one of an object-side surface of the second lens element, an image-side surface of the second lens element, the object-side surface of the third lens element and an image-side surface of the third lens element has at least one inflection point, a focal length of the imaging optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, a sum of absolute values of ratios f/fi is Σ|f/fi|, a curvature radius of the object-side surface of the third lens element is R5, a curvature radius of the image-side surface of the third lens element is R6, and the following conditions are satisfied:

2.0<Σ|f/fi|<5.0, wherein i=1, 2, 3, 4, 5, 6; and

−4.0<(R5+R6)/(R5−R6)<0.65.

7. The imaging optical lens assembly of claim 6, wherein the fifth lens element has negative refractive power, and the sixth lens element has positive refractive power.

8. The imaging optical lens assembly of claim 6, wherein the image-side surface of the third lens element is concave in a paraxial region thereof, and at least three of the six lens elements of the imaging optical lens assembly are made of plastic material.

9. The imaging optical lens assembly of claim 6, wherein a curvature radius of an object-side surface of the sixth lens element is R11, an entrance pupil diameter of the imaging optical lens assembly is EPD, the focal length of the first lens element is f1, the focal length of the third lens element is f3, and the following conditions are satisfied:

|R11/EPD|1.50; and 1.25<f1/f3<5.0.

10. The imaging optical lens assembly of claim 6, wherein an axial distance between an object-side surface of the first lens element and an image-side surface of the sixth lens element is Td, a maximum image height of the imaging optical lens assembly is ImgH, and the following condition is satisfied:

4.0<Td/ImgH≤5.64.

11. The imaging optical lens assembly of claim 6, wherein a curvature radius of an object-side surface of the fourth lens element is R7, a curvature radius of an image-side surface of the fourth lens element is R8, a curvature radius of an object-side surface of the fifth lens element is R9, a curvature radius of an image-side surface of the sixth lens element is R12, and the following conditions are satisfied:

|R7/R8|<1.10; and

−1.0<(R9+R12)/(R9−R12)<1.0.

12. The imaging optical lens assembly of claim 6, wherein an axial distance between the first lens element and the second lens element is T12, the focal length of the imaging optical lens assembly is f, and the following condition is satisfied:

0.80<T12/f<2.0.

13. The imaging optical lens assembly of claim 6, wherein an image-side surface of the fifth lens element and an object-side surface of the sixth lens element are both aspheric, the fifth lens element and the sixth lens element are cemented together.

14. An image capturing unit, comprising:
the imaging optical lens assembly of claim 6; and
an image sensor, wherein the image sensor is disposed on an image surface of the imaging optical lens assembly.

15. An electronic device, comprising:
the image capturing unit of claim 14.

16. An imaging optical lens assembly comprising six lens elements, the six lens elements being, in order from an object side to an image side, a first lens element, a second lens element, a third lens element, a fourth lens element, a fifth lens element and a sixth lens element;
wherein the first lens element has negative refractive power, the second lens element has negative refractive power, the third lens element has negative refractive power, and the imaging optical lens assembly has a total of six lens elements;
wherein a focal length of the imaging optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, a sum of absolute values of ratios f/fi is Σ|f/fi|, a curvature radius of an object-side surface of the third lens element is R5, a curvature radius of an image-side surface of the third lens element is R6, a curvature radius of an object-side surface of the sixth lens element is R11, an entrance pupil diameter of the imaging optical lens assembly is EPD, an axial distance between an object-side surface of the first lens element and an image-side surface of the sixth lens element is Td, a maximum image height of the imaging optical lens assembly is ImgH, and the following conditions are satisfied:

2.0<Σ|f/fi|<5.0, wherein i=1, 2, 3, 4, 5, 6;

−4.50<(R5+R6)/(R5−R6)<2.80;

|R11/EPD|<1.50; and 1.0<Td/ImgH≤5.64.

17. The imaging optical lens assembly of claim 16, wherein the focal length of the first lens element is f1, the focal length of the third lens element is f3, and the following condition is satisfied:

1.25<f1/f3<5.0.

18. The imaging optical lens assembly of claim 16, wherein a curvature radius of an object-side surface of the fourth lens element is R7, a curvature radius of an image-side surface of the fourth lens element is R8, and the following condition is satisfied:

|R7/R8|<1.10.

19. The imaging optical lens assembly of claim 16, wherein at least one of an object-side surface of the second lens element, an image-side surface of the second lens element, the object-side surface of the third lens element and the image-side surface of the third lens element has at least one inflection point.

20. The imaging optical lens assembly of claim 16, wherein an image-side surface of the fifth lens element and the object-side surface of the sixth lens element are both aspheric, the fifth lens element and the sixth lens element are cemented together, half of a maximal field of view of the imaging optical lens assembly is HFOV, and the following condition is satisfied:

|1/tan(HFOV)|<0.50.

21. An imaging optical lens assembly comprising six lens elements, the six lens elements being, in order from an object side to an image side, a first lens element, a second lens element, a third lens element, a fourth lens element, a fifth lens element and a sixth lens element;

wherein the first lens element has negative refractive power, the second lens element has negative refractive power, the third lens element has negative refractive power, the third lens element has an object-side surface being concave in a paraxial region thereof and an image-side surface being concave in a paraxial region thereof, and the imaging optical lens assembly has a total of six lens elements;

wherein an axial distance between the first lens element and the second lens element is T12, a focal length of the imaging optical lens assembly is f, and the following condition is satisfied:

$0.80 < T12/f < 2.0$.

22. The imaging optical lens assembly of claim 21, wherein the second lens element has an object-side surface being convex in a paraxial region thereof, a curvature radius of an object-side surface of the sixth lens element is R11, an entrance pupil diameter of the imaging optical lens assembly is EPD, and the following condition is satisfied:

$|R11/EPD| < 1.50$.

23. The imaging optical lens assembly of claim 21, wherein the focal length of the imaging optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, a sum of absolute values of ratios f/fi is $\Sigma|f/fi|$, and the following condition is satisfied:

$2.0 < \Sigma|f/fi| < 5.0$, wherein $i = 1, 2, 3, 4, 5, 6$.

24. The imaging optical lens assembly of claim 21, wherein a focal length of the first lens element is f1, a focal length of the third lens element is f3, and the following condition is satisfied:

$1.25 < f1/f3 < 5.0$.

25. The imaging optical lens assembly of claim 21, wherein a curvature radius of an object-side surface of the fourth lens element is R7, a curvature radius of an image-side surface of the fourth lens element is R8, and the following condition is satisfied:

$|R7/R8| < 1.10$.

26. The imaging optical lens assembly of claim 21, wherein an axial distance between an object-side surface of the first lens element and an image-side surface of the sixth lens element is Td, a maximum image height of the imaging optical lens assembly is ImgH, and the following condition is satisfied:

$1.0 < Td/ImgH \leq 5.64$.

27. An image capturing unit, comprising:
the imaging optical lens assembly of claim 21; and
an image sensor, wherein the image sensor is disposed on an image surface of the imaging optical lens assembly.

28. An electronic device, comprising:
the image capturing unit of claim 27.

* * * * *